(12) United States Patent
Theesfeld et al.

(10) Patent No.: US 8,191,487 B2
(45) Date of Patent: Jun. 5, 2012

(54) WALL-MOUNTED ACCESSORY HOLDER

(75) Inventors: Jeffery Todd Theesfeld, Barto, PA (US); Matthew A. Sommerfield, Allentown, PA (US); Jarrett Seng, Orefield, PA (US)

(73) Assignee: Humanscale Corporation, New York, NY (US)

( * ) Notice: Subject to any disclaimer, the term of this patent is extended or adjusted under 35 U.S.C. 154(b) by 445 days.

(21) Appl. No.: 12/392,985

(22) Filed: Feb. 25, 2009

(65) Prior Publication Data
US 2010/0213151 A1   Aug. 26, 2010

(51) Int. Cl.
*A47B 9/00* (2006.01)

(52) U.S. Cl. ............ 108/144.11; 108/147; 108/49; 108/106; 108/50.01

(58) Field of Classification Search ............ 108/147, 108/108, 144.11, 106, 110, 50.01, 50.02, 108/49, 42, 48, 152; 248/125.1, 123.11, 248/161, 162.1, 295.11, 297.11
See application file for complete search history.

(56) References Cited

U.S. PATENT DOCUMENTS

| | | | | |
|---|---|---|---|---|
| 1,043,638 | A * | 11/1912 | Sneed | 108/49 |
| 1,797,847 | A * | 3/1931 | Vandagriff | 108/49 |
| 1,894,991 | A * | 1/1933 | Hayes | 108/49 |
| 2,026,011 | A * | 12/1935 | Wright | 108/49 |
| 2,051,508 | A * | 8/1936 | Wildeboer | 248/123.2 |
| 2,642,250 | A * | 6/1953 | Kasnowich | 108/49 |
| 3,255,719 | A * | 6/1966 | Klavins | 108/26 |
| 3,862,734 | A * | 1/1975 | Buchin et al. | 248/125.2 |
| 4,077,535 | A | 3/1978 | Oriol | |
| 4,527,942 | A * | 7/1985 | Smith | 248/297.11 |
| D289,081 | S | 3/1987 | Ludwig | |
| 4,697,661 | A | 10/1987 | Pajerski et al. | |
| 5,020,793 | A | 6/1991 | Loane | |
| 5,183,162 | A * | 2/1993 | Ritzenthaler | 248/297.11 |
| 5,335,651 | A | 8/1994 | Foster et al. | |
| 5,337,845 | A | 8/1994 | Foster et al. | |
| 5,394,809 | A | 3/1995 | Feldpausch et al. | |
| 5,409,107 | A | 4/1995 | Browne | |
| 5,457,831 | A | 10/1995 | Foster et al. | |
| 5,630,566 | A * | 5/1997 | Case | 248/284.1 |
| 5,673,983 | A | 10/1997 | Carlson et al. | |

(Continued)

FOREIGN PATENT DOCUMENTS

EP    0253333 B1   3/1993

(Continued)

OTHER PUBLICATIONS

International Search Report and Written Opinion by the International Searching Authority for PCT Application PCT/US2009/035180 issued on Apr. 14, 2009.

(Continued)

*Primary Examiner* — Jose V Chen
(74) *Attorney, Agent, or Firm* — Jones, Walker, Waechter, Poitevent, Carrere & Denegre, LLP

(57) ABSTRACT

Accessory holders useful for facilitating the support and positional adjustment of secured accessories. More particularly, a positionally adjustable accessory holder for use with one or more accessories, preferably input or output devices, such as video displays, monitors, keyboards, keypads, laptops and the like. The accessory holder further allows for easy three-dimensional adjustment of two such devices to place the devices in relative positions more ergonomically desirable for a variety of users and workspaces, and features a counterbalance mechanism for balancing the weight of the secured accessories.

28 Claims, 12 Drawing Sheets

U.S. PATENT DOCUMENTS

| | | | |
|---|---|---|---|
| 5,692,815 A * | 12/1997 | Murphy | 108/43 |
| 5,765,842 A | 6/1998 | Phaneuf | |
| 5,779,211 A | 7/1998 | Bird | |
| 5,826,842 A | 10/1998 | Paulse et al. | |
| 5,918,841 A * | 7/1999 | Sweere et al. | 248/123.11 |
| 6,098,935 A | 8/2000 | Kaplan et al. | |
| 6,110,999 A | 8/2000 | Ourth et al. | |
| 6,264,156 B1 * | 7/2001 | Yeh | 248/346.01 |
| 6,286,794 B1 | 9/2001 | Harbin | |
| 6,339,732 B1 | 1/2002 | Phoon et al. | |
| 6,493,217 B1 | 12/2002 | Jenkins, Jr. | |
| 6,493,220 B1 | 12/2002 | Clark et al. | |
| 6,683,784 B1 | 1/2004 | Bidwell et al. | |
| 6,698,770 B2 | 3/2004 | Eriksson et al. | |
| 6,712,008 B1 * | 3/2004 | Habenicht et al. | 108/50.01 |
| 6,749,158 B2 * | 6/2004 | Timm | 108/50.02 |
| D507,477 S * | 7/2005 | Pfister | D8/363 |
| 6,997,422 B2 * | 2/2006 | Sweere et al. | 248/123.11 |
| 7,009,840 B2 | 3/2006 | Clark et al. | |
| 7,036,787 B1 * | 5/2006 | Lin | 248/123.11 |
| 7,063,296 B2 * | 6/2006 | Williams | 248/285.1 |
| 7,066,433 B2 | 6/2006 | Oddsen, Jr. | |
| 7,082,882 B2 * | 8/2006 | Heimbrock | 108/49 |
| 7,178,469 B2 * | 2/2007 | Goza | 108/50.01 |
| 7,374,139 B2 * | 5/2008 | Tsai et al. | 248/917 |
| 7,537,188 B2 * | 5/2009 | Root et al. | 248/295.1 |
| 7,784,747 B2 * | 8/2010 | Gan et al. | 248/123.11 |
| 7,823,847 B2 * | 11/2010 | Bremmon et al. | 248/920 |
| 2002/0125664 A1 | 9/2002 | Eriksson et al. | |
| 2002/0165641 A1 | 11/2002 | Manalang et al. | |
| 2003/0042373 A1 | 3/2003 | Macleod | |
| 2004/0054436 A1 | 3/2004 | Haitin et al. | |
| 2004/0200870 A1 | 10/2004 | Haber | |
| 2004/0262867 A1 | 12/2004 | Arceta et al. | |
| 2005/0062238 A1 | 3/2005 | Broadfield et al. | |
| 2005/0176508 A1 | 8/2005 | Chastain | |
| 2005/0206107 A1 | 9/2005 | Schubert et al. | |
| 2006/0125356 A1 | 6/2006 | Meek, Jr. et al. | |
| 2006/0186622 A1 | 8/2006 | Darling, III | |
| 2007/0228680 A1 | 10/2007 | Reppert et al. | |
| 2009/0212184 A1 * | 8/2009 | Bourgeois et al. | 248/288.11 |

FOREIGN PATENT DOCUMENTS

| | | |
|---|---|---|
| EP | 1574196 B1 | 6/2006 |
| JP | 1192357 A | 8/1989 |
| JP | 2002177347 A | 6/2002 |
| JP | 2003220032 A | 8/2003 |
| WO | 2005107525 A2 | 11/2005 |
| WO | 2007035185 A2 | 3/2007 |

OTHER PUBLICATIONS

T5 Brochure, Point-of-Care Technology Carts for PC's, Laptops and Tablet PC's by Humanscale Corporation issued on Feb. 1, 2006.

Point-of-Care Hospital Carts & Wall Mounts Feature Unotron Washable Computer Keyboards and Mice to Mitigate Spread of Hospital Infection literature published on Apr. 3, 2007.

smartTouch Medical, Inc. and S&S Med Cart, Inc. to Debut the smartCART (TM) Partner Plus II (TM) Finger Activated Rolling Medicine Cart at the 41st ASHP Clinical Meeting and Tradeshow; Global leader in hospital medicine carts to unveil innovative rolling medical dispensing cart that provides secure access to medication, syringes and other controlled or regulated medical items, with the touch of a finger literature published on Nov. 28, 2006.

bioMETRX, Inc. and S&S MedCart, Inc. Sign Deal to Jointly Develop Finger Activated Medicine Carts to Help Hospitals Control Access to Controlled Substances; Global Leader in Rolling Medicine Carts to Integrate SmartTOUCH (TM) Technology to Provide Secure Access to Medication, Syringes and Other Controlled or Regulated Medical Items, With the Touch of a Finger literature published on May 15, 2006.

Artromick Aligns with McKesson to Enhance Medication Safety at the Patients' Bedside; Strategic Relationship Combines Leading Mobile Computing Workstations with Unique Integration Software to Give Nurses More Time with Patients literature published on Feb. 26, 2008.

Valence Battery Solutions Increasingly of Interest in Health Care Industry; Numerous Industry Leaders Demonstrating Use of Valence Power Technology at HIMSS 2005 literature published on Feb. 15, 2005.

International Search Report and Written Opinion by the International Searching Authority for PCT Application PCT/US2009/35185 issued on Apr. 29, 2009.

International Search Report and Written Opinion by the International Searching Authority for PCT Application PCT/US2009/35183 issued on Apr. 30, 2009.

* cited by examiner

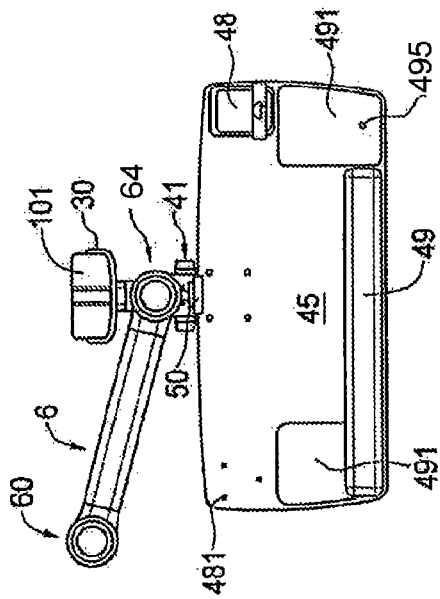
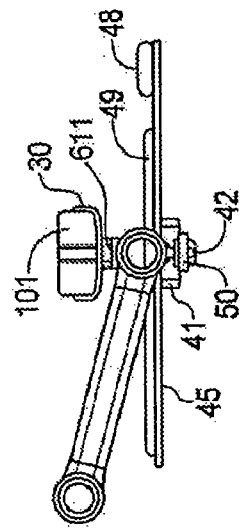
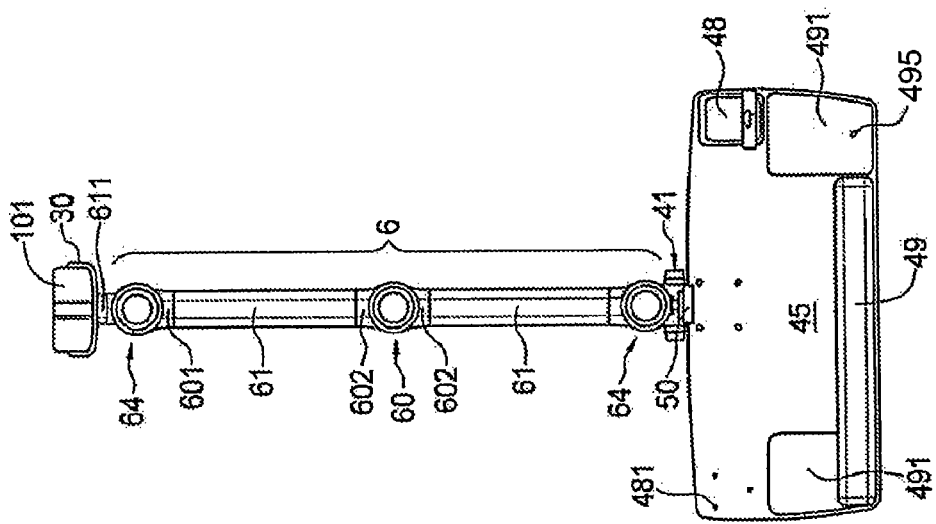

WALL-MOUNTED ACCESSORY HOLDER

I. CROSS-REFERENCE TO RELATED APPLICATION

Not Applicable.

II. STATEMENT REGARDING FEDERALLY SPONSORED RESEARCH OR DEVELOPMENT

Not Applicable.

III. THE NAMES OF THE PARTIES TO A JOINT RESEARCH AGREEMENT

Not Applicable.

IV. INCORPORATION-BY-REFERENCE OF MATERIAL SUBMITTED ON A COMPACT DISC

Not Applicable.

V. BACKGROUND

A. Field of the Invention

The present invention is generally directed to mechanisms useful for facilitating the support and positional adjustment of attached accessories. More particularly, the invention provides a positionally adjustable accessory holder for use with one or more accessories, preferably input or output devices, such as video displays, monitors, keyboards, keypads, laptops and the like. The accessory holder further allows for easy three-dimensional adjustment of two such devices to place the devices in relative positions more ergonomically desirable for a variety of users and workspaces.

B. Background Art

As more individuals spend an increasing amount of time using computers, computer users are sitting or standing at desks or workstations in front of input or output devices such as video displays, keyboards and the like for longer periods of time. This time encompasses performing activities that include inputting data, viewing video or data display, and otherwise interacting with digital media.

The increasing amount of time associated with such activity has been associated with various health problems. These problems include muscle strain, fatigue, and stress caused by improper posture. According to experts in ergonomics, there are several easy and effective ways in which computer users can improve their physical comfort, fight fatigue, and reduce the risk of injuries from repetitive motions.

Posture is one area in which minor adjustments can quickly yield benefits. At home, and especially in more stressful environments like a busy office or hospital, users may force their bodies into rigid positions that result in fatigue, muscle strain, and, potentially, injury. Maintaining what experts refer to as "optimal ergonomic positioning" can increase energy levels and improve overall comfort. Good posture keeps the spine in what health professionals call the "neutral position." Achieving a neutral posture entails lifting the rib cage away from the hips, tucking in the stomach, pulling the shoulders back, centering the weight of the head atop the spine, and maintaining the lower back in a gentle C-shaped curve. Sustaining this position, whether standing or sitting, can help reduce muscle strain and relieve pressure on the lower back.

Beyond spinal posture, optimal ergonomic positioning requires tailoring the work area to fit the user's needs. To accomplish this, it is necessary to position input and output devices in appropriate positions. Having an output device, like a video display, in proper position reduces muscle strain caused by the weight of the head leaning too far backward or forward. Having an input device, like a keyboard or mouse, in proper position reduces muscle strain in a user's arms, but also provides serious protection from a variety of musculoskeletal disorders, including Carpal Tunnel Syndrome, neck pain, and upper and lower back pain.

With the increased use of flat screen displays, wall-mounted workstations have become increasingly useful to create a very slim profile within a workspace. This may be particularly useful in settings like hospitals or other work areas where a full computer system or desk is not possible. In certain settings, particularly in hospitals or other work areas where space is limited, an output device and an input device may be integrated together, and further mounted to a wall, such that the devices, and any connected devices or processors, are adjacent within a small footprint. Moreover, in many hospitals or other high traffic work areas, multiple users move around to multiple work stations as they address patient or inventory needs. Additionally, the user of the accessories may have unique positioning needs, such as a desire to enter medical records while maintaining eye contact with a resting patient. Other workspaces in which the present invention may be useful include manufacturing facilities, supermarket kiosks and other workspaces which may require the combination of a monitor and a keyboard in use in either a standing or sitting position.

In order to be ergonomically beneficial to all potential users, an input device and output device, integrated and mounted to a wall or workstation in some fashion, should be capable of three dimensional adjustment by each user to the most comfortable position for both devices, as well as adjustment to different tasks within the space around the devices where movement of the devices allows the user to more capably conduct his or her work. This includes relative adjustment between the devices. None of the prior art systems support input and output devices integrated together and adjustable to optimal positions, with a wide range of movement and adjustment in three dimensions.

VI. BRIEF SUMMARY OF THE INVENTION

One embodiment of the present invention comprises an accessory holder comprising a vertical track; at least one roller assembly slidably engaged with the track; each roller assembly comprising an attachment means adapted to pivotally engage an accessory to the roller assembly; and at least one counter-balance means, each counter-balance means operably engaged to the track and to the roller assembly such that the vertical position of the accessory may be slidably adjusted along the track by a user exerting force upon the attachment means, and wherein the counter-balance means balances the weight of the accessory. In this or other embodiments, the vertical track may comprise an exposed inner channel, the roller assembly slidably engaged within the inner channel of the track, the vertical track may comprise one or more exposed side channels, the roller assembly slidably engaged within the side channels of the track, or the vertical track comprises a rear panel including mounting apertures spaced apart, such that the vertical track may be mounted to a substantially flat surface by inserting one or more screws through the mounting apertures into the substantially flat surface. In this or other embodiments, the vertical track may further comprise a plurality of apertures to releasably engage the roller assembly at a plurality of vertical positions along the track, or the vertical track may be mounted to a wall structure such that the bottom end of the vertical track is mounted about fourteen inches from the plane of the floor of a room.

Another embodiment of the present invention comprises an accessory holder wherein the roller assembly comprises a carriage, which may be U-shaped, and one or more friction reducers, which may comprise one or more pairs of bearing assemblies secured to the sides of the carriage, wherein the bearing assemblies slide within one or more side channels of the vertical track, engaging the carriage and the vertical track to facilitate sliding movement of the roller assembly within the vertical track. In such an embodiment, the bearing assemblies may comprise a bearing stud, a glide bushing, a ball bearing, and a bearing spacer, engaged to reduce friction as the glide bushing and ball bearing roll around the axis of the bearing stud against the track. The roller assembly may further comprise one or more spring-loaded bearing assembly mounts, each spring-loaded bearing assembly mount comprising two bearing assemblies mounted to a roller mount piece, the roller mount piece secured to the sides of the carriage by one or more spring washers and one or more screws such that the bearing assemblies provide support to the weight of the accessory in addition to providing friction reduction.

One embodiment of the present invention comprises an accessory holder wherein the counter-balance means comprises a device selected from the group of: a constant force spring device, a block and tackle device, or a spiral balance device. In such an embodiment, the counter-balance means may further comprise a constant force spring device. The constant spring force device may comprise one or more wound springs, a first end of each of the wound springs secured to the track, and a second end of each of the springs secured to the roller assembly, such that the wound spring balances the weight of the accessory mounted to the attachment means as the roller assembly moves along the vertical track. The attachment means may comprise an articulating arm pivotally engaged to the roller assembly at its proximal end and pivotally engaged to an accessory mounting bracket at its distal end.

Another embodiment of the present invention comprises an accessory holder wherein the accessory mounting bracket comprises a ball joint such that the accessory may pivot relative to the articulating arm in all directions. The ball joint bracket may be VESA compliant for mounting of a flat-screen display. In this or other embodiments, the accessory mounting bracket may comprise a hinge mounted to a keyboard platform, and the keyboard platform may rotate between a horizontal position and a vertical position.

Yet another embodiment comprises an accessory holder comprising an articulating arm further, which may comprise one or more elongated members and one or more pivot joints, wherein the one or more pivot joints connect one or more elongated members together such that the elongated members pivot with respect to each other in either direction. In this or other embodiments, one or more of the elongated members may comprise a recess adapted to retain one or more cables associated with the accessory, and the recess may further comprise a cover which retains the cable associated with the accessory within the recess. Moreover, the one or more pivot joints of the articulating arm may comprise two hollow collars operably engaged with a hollow inner cylinder such that the two collars pivot about the inner cylinder and such that the elongated members secured to the hollow collars pivot in relation to each other.

Another embodiment of the present invention may comprise an accessory holder comprising a vertical track; two roller assemblies slidably engaged with the track; each roller assembly comprising an attachment means adapted to pivotally engage an accessory to the roller assembly; and two counter-balance means, each of the counter-balance means operably engaged to the track and to one of the two roller assemblies such that the vertical position of the accessory associated with the roller assembly may be slidably adjusted along the track by a user exerting force upon the attachment means associated with the roller assembly, and wherein the counter-balance means balances the weight of the accessory. In this or other embodiments, the first roller assembly may comprise a first attachment means comprising an articulating arm pivotally engaged with an accessory mounting bracket at a distal end. Optionally, the accessory mounting bracket may comprise a ball joint. In this or other embodiments, a second roller assembly may comprise a second attachment means comprising an articulating arm pivotally engaged with a hinge at a distal end. In many embodiments, the second attachment means comprises a releasable lock pin operatively engaging the roller assembly to the track at one of a plurality of apertures. In this or other embodiments, the accessory mounting bracket may comprise a hinge attached to a keyboard platform, such that the keyboard platform may rotate between a horizontal and a vertical position, and may comprise a thumbscrew, wherein the thumbscrew is in threaded engagement with the hinge such that turning of the thumbscrew tilts the keyboard platform to a position located between a position at about zero degrees from horizontal and a position at about fifteen degrees above the horizontal. In this or other embodiments, the keyboard platform may comprise a wrist support secured to the keyboard platform. The wrist support may be removably secured to the platform in a left or right position such that a user may move the wrist support to either position to support a left-handed user or a right-handed user. In this or other embodiments, the keyboard platform may further comprise a mouse retainer, the mouse retainer adapted to restrain a computer mouse from movement when the keyboard platform moves laterally or rotates upward. The mouse retainer may be removably secured to the keyboard platform in a left or right position such that a user may move the mouse retainer to either position to support a left-handed or right-handed user. Moreover, the keyboard platform may further comprise at least one swivel platform, the swivel platform pivotally engaged with the bottom surface of the keyboard platform such that the swivel platform can be moved outward for use or retracted underneath the keyboard platform for storage. In some embodiments, the keyboard platform may comprise two swivel platforms, a first swivel platform pivotally engaged with the left side of the bottom surface of the keyboard platform, and a second swivel platform pivotally engaged with the right side of the bottom surface of the keyboard platform. In many embodiments, the keyboard platform may comprise white phenolic resin, or it may comprise one or more mouse pads to support the use of a computer mouse on the keyboard platform.

Some embodiments of the present invention comprise an accessory holder comprising a frame and a strap having a first strap end portion connected to the frame and a second strap end portion connected to the frame, such that an opening is formed between said frame and said strap, at least one of said first strap end portion and said second strap end portion being adjustably connected to said frame such that the size of said opening can be adjusted.

One embodiment of the present invention comprises an accessory holder wherein the attachment means comprises a releasable lock pin operatively engaging the roller assembly to the track at one of a plurality of apertures. In this or other embodiments, the attachment means may further comprise an articulating arm pivotally engaged to the roller assembly at its proximal end and pivotally engaged to an accessory mounting bracket at its distal end, wherein the accessory mounting bracket comprises a release handle in operative engagement with the releasable lock pin by way of a cable guide pull, such that pulling the release handle removes the lock pin from the aperture on the track to release the roller assembly from the track, and releasing the release handle allows the lock pin to return into an adjacent aperture on the track to secure the roller assembly to the track. In some embodiments, the attachment means may further comprise an articulating arm pivotally engaged to the roller assembly at its proximal end and pivotally engaged to an accessory mounting bracket at its distal end, wherein the accessory mounting bracket comprises a release handle in operative engagement with the releasable lock pin by way of a cable guide pull, such that pulling the release handle removes the lock pin from the aperture on the track to release the roller assembly from the track, and releasing the release handle allows the lock pin to return into an adjacent aperture on the track to secure the roller assembly to the track.

The above summary of the present invention is not intended to describe each illustrated embodiment or every possible implementation of the present invention. The figures and the detailed description which follow, however, do particularly exemplify these embodiments.

VII. BRIEF DESCRIPTION OF THE SEVERAL VIEWS OF THE DRAWINGS

In consideration of the following detailed description of various embodiments, the invention may be more completely understood in connection with the following drawings.

FIGS. 3A, 3B and 3C are illustrations of a top view of an embodiment of the present invention in three configurations.

Figure 1:
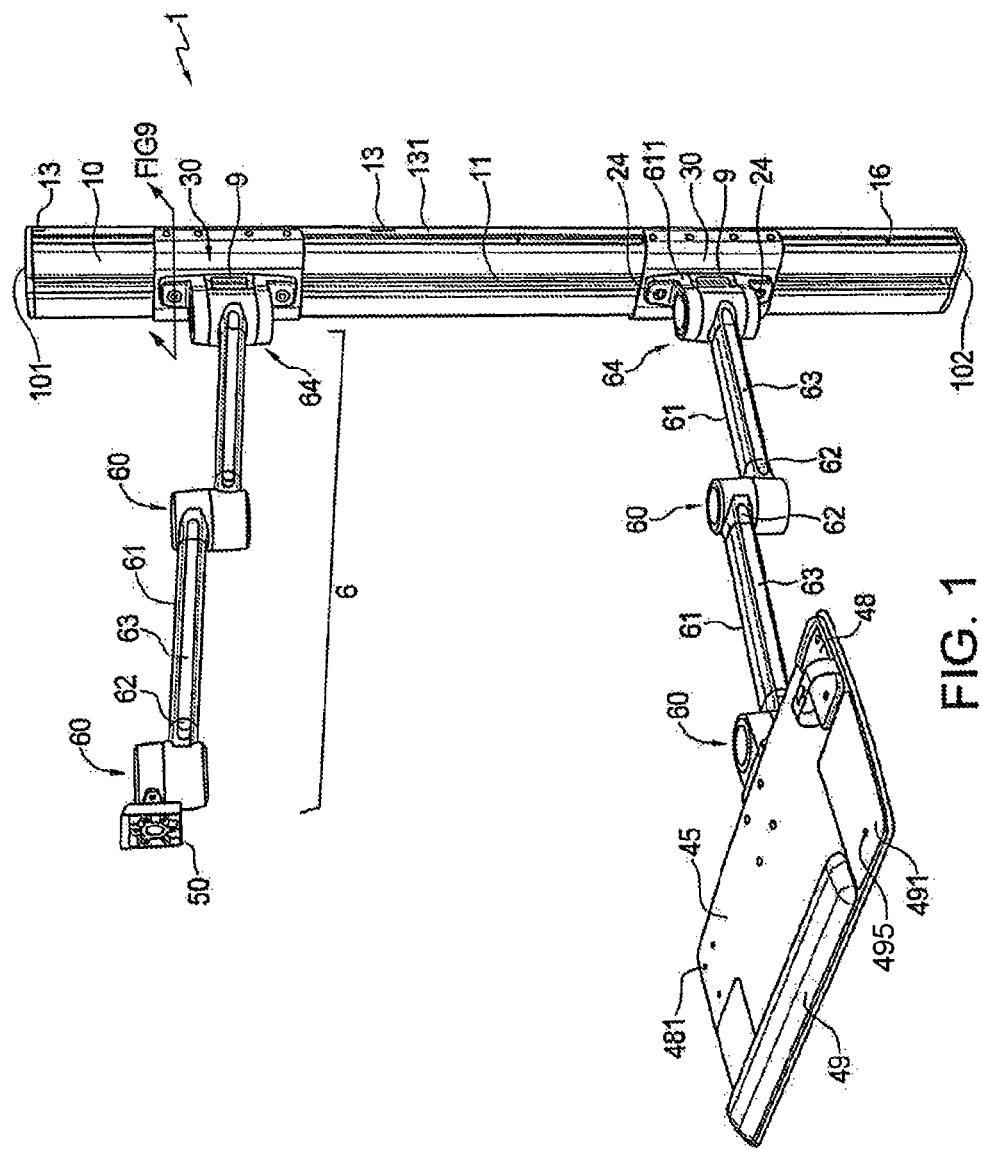
FIG. 1 is an illustration of a perspective view of one embodiment of the present invention.

While the invention is amenable to various modifications and alternative forms, specifics thereof have been shown by way of example in the drawings and will be described in detail such that the disclosure will be thorough and complete, and will fully convey the scope of the invention to those skilled in the art. It should be understood, however, that the intention is not to limit the invention to the particular embodiments described. On the contrary, the intention is to cover all modifications, equivalents, and alternatives falling within the spirit and scope of the invention as defined by the appended claims.

VIII. DETAILED DESCRIPTION OF THE INVENTION

The present invention provides an accessory holder 1 generally useful for facilitating positional adjustment and support of a variety of attached devices or accessories. The inventive mechanisms are particularly useful for positional adjustment and support of different devices or accessories associated with electronic media input and output devices or accessories. Throughout, the term "accessory" shall mean any input or output device which may be utilized by a user to monitor or collect data, to display data or results, to communicate with a remote or local processor, to communicate with others, to transmit or receive information, and so on. The term "accessory" is not meant to be limiting, but rather, should be read as broadly as possible within the scope of the invention.

In some embodiments, a display device 3 (see FIG. 5A), such as a video display (e.g., a flat-screen monitor), and an input device platform 45 (see, e.g., FIG. 1), suitable for holding input devices such as a keyboard and mouse, can be secured to the inventive accessory holder 1. In further embodiments, additional accessories, such as a central processing unit 80 (FIG. 5A), power strip 81 (FIG. 5A), touch screen (not shown), mouse (not shown), light source (not shown), etc., can be secured to the accessory holder 1 in the same manner that keyboard platform 45 and display device 3 are secured to the accessory holder 1, as described below and shown in, e.g., FIG. 5A, and as may be generally known in the art.

For simplicity, the invention will be described in terms of allowing for positional adjustment and support of two accessories, best shown in FIG. 5A, a flat screen monitor 3 and a keyboard (not shown) resting upon keyboard platform 45. Accordingly, any description of the accessory holder 1 in terms of positional adjustment or support of a flat screen monitor 3 or keyboard resting upon keyboard platform 45 is not intended to be limiting to specific devices or attachment means, but rather, is intended to generally describe the ability of the accessory holder 1 of the invention to be used with a wide variety of devices, accessories and attachment means. Generally, the inventive accessory holder 1 comprises a novel counter-balance mechanism to support the weight of the accessory or device to be secured to the accessory holder 1.

The accessory holder 1 will be supported on a track 10 mounted on a wall, a desk, or some other structurally secure, generally flat, vertical object within the work space. Preferably, the accessory holder 1 may be mounted to walls or structural columns within a high traffic work space; the accessory holder 1 reduces the footprint of the secured accessories' intrusion into the work space or enhances the convenience of users. FIG. 1 is an illustration of an embodiment of the accessory holder 1. In this embodiment, the accessory holder 1 comprises a track 10, at least one roller assembly 30 slidably engaged with the track 10, each of the roller assemblies 30 comprising an attachment means for pivotally engaging an accessory to the roller assembly, and a counter-balance mechanism 20 (hidden in FIG. 1, but illustrated in FIG. 9) operatively engaging the roller assembly 30 and the track 10, such that the roller assembly 30 may be slidably engaged vertically along track 10 and the counter-balance mechanism 20 balances the weight of the accessory secured to the roller assembly 30.

Track 10 may be adapted to attach to a support by any means known in the art. Preferably, track 10 is formed for attachment at a rear-facing surface (not shown) to a support, such as a wall structural member, mounting pole, display arm, or other structural support by, for example, installation of screws 8 into wall studs through countersunk holes in the track 10 (as shown in FIG. 5A), or other similar installation practices. Preferably, track 10 may comprise extruded metal, e.g., aluminum, or other structural materials suitable for supporting the weight of the accessory holder 1 with one or more roller assemblies 30 and an accessory (such as a display device 3 or keyboard upon a keyboard platform 45) secured to each roller assembly 30. Track 10 may further comprise one or more track end caps 101, 102, which may attach to the exposed top and bottom of the track 10 by any conventional means. The track end caps 101, 102 may be removably secured to the track 10 by any means, including, but not limited to, by snapping into place, or by screws or bolts engaged with the track 10. Preferably, the track end caps 101, 102 may comprise a shape suitable for gripping the top or bottom end of the track 10, and may snap into place to form a removably secure attachment with track 10 at either its top or bottom. A set screw may be used to hold the track end caps 101, 102 to the track 10. By having track end caps 101, 102 that are removably secured, or that snap into place, a user may easily remove the end caps 101, 102, remove the roller assembly 30 from the track 10 for replacement or repair and/or remove the counter-balance mechanism 20 from the track 10 for replacement or repair. Once the roller assembly 30 or counter-balance mechanism 20 is replaced or repaired, the user may replace the end caps 101, 102.

Figure 9:
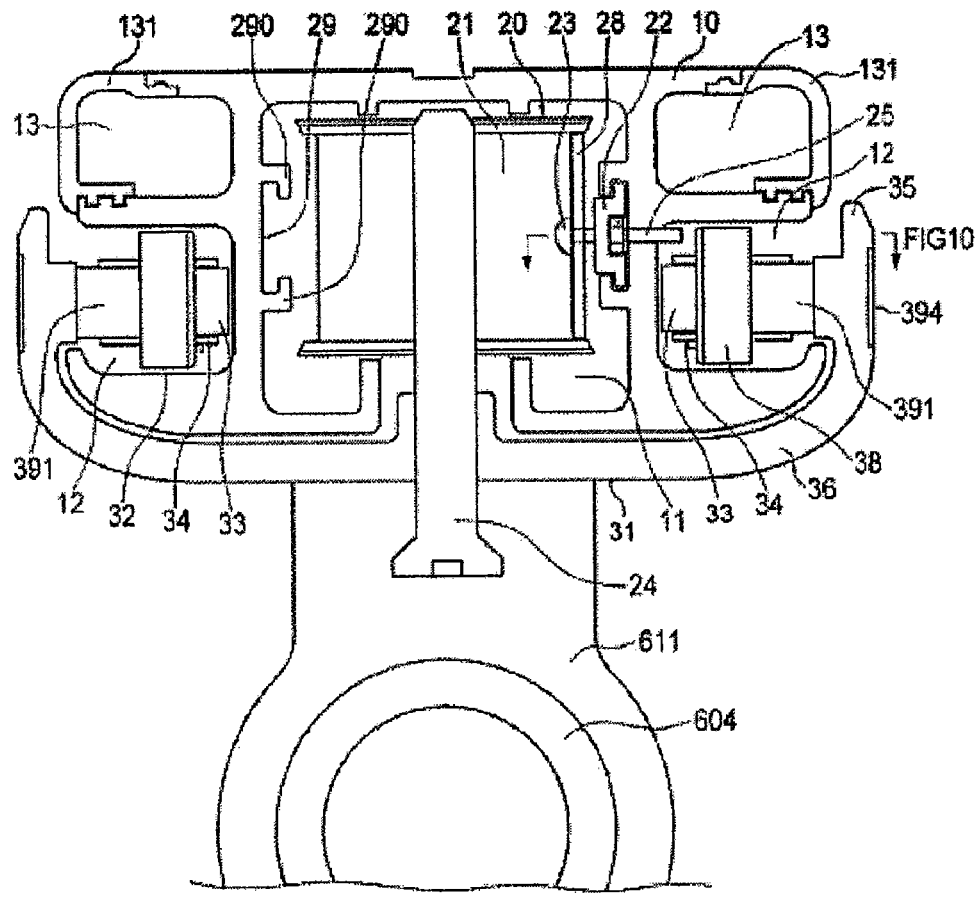
FIG. 9 is an illustration of a cross-sectional view of one embodiment of the present invention.

Referring still to the embodiment shown in FIG. 1 and the cross-sectional view shown in FIG. 9, track 10 may comprise a center channel 11, which may house one or more counter-balance mechanisms 20. Track 10 may further comprise two side channels 12 to facilitate vertical sliding movement of roller assemblies 30 along track 10, and two cable channels 13 to house power or data cables 2 (as shown in FIG. 3). As shown in FIG. 9, the cable channels 13 may comprise sectional covers 131 that are easily removed (by being fabricated from plastic and snapping into place, or as otherwise known in the art) and replaced by a user to accommodate cables 2 (shown in FIG. 5A), as necessary, when using the accessory holder 1 (see FIGS. 5A and 5B for a general view of the cable management features of the present invention).

Track 10 can be approximately 3 to 4 inches in depth, in order to accommodate the counter-balance mechanism 20 within center channel 11. The length of track 10 may comprise any length suitable for the purposes for which the accessory holder 1 is being installed such that the top most edge of track 10 is positioned at a height h3 from the floor plane, and the bottom most edge of track 10 is positioned at a height h1 from the floor plane. In the embodiments shown, for example, in FIGS. 4A and 4B, the length of track 10 (h3-h1) is approximately fifty-four inches (54 in.). An accessory holder 1 intended to provide both a sitting and standing station for a hospital environment could comprise a track 10 of length approximately fifty-four inches (54 in.) when vertically mounted approximately fourteen inches (14 in.) from the floor of the work space; this would provide sufficient height along the track 10 for use by average-height users in both standing and sitting positions of a monitor 3 and a keyboard secured to the roller assemblies 30 slidably mounted to track 10. If the accessory holder 1 intended to provide only a sitting station for users with disabilities who are bound to wheelchairs, then the length h3-h1 of track 10 could be shorter, and the height h1 at which track 10 is mounted above the floor plane may be shorter because less of a range of adjustment may be needed. One skilled in the art will appreciate that the length of track 10 and the height at which track 10 is mounted will vary from application to application to accommodate varying types of users, and these dimensions are provided as a suggestion only.

Referring still to FIGS. 1 and 9, the roller assembly 30 slides within side channels 12 of track 10 in a vertical upward or downward direction. Preferably, the roller assembly 30 may comprise a carriage 31 that is U-shaped, with a front portion 36 and sides 35 which engage side channels 12 of the track 10. In other embodiments, the roller assembly 30 may be generally C-shaped or generally flat. Referring still to FIG. 9, the roller assembly 30 is adapted to slide vertically along the track 10 while remaining engaged with the track at all times. To facilitate free movement of the roller assembly 30 along the track 10, the roller assembly 30 may further comprise friction reducers such as bearing assemblies 32, 33 allowing for sliding movement of the roller assembly 30 within the side channels 12 of the track 10. Although bearing assemblies 32, 33 will be described in detail, one of skill in the art will appreciate that other friction reducing methods and assemblies may be used in a like manner to facilitate the sliding movement of the roller assembly 30 within the side channels 12 of the track 10.

Figure 8A:
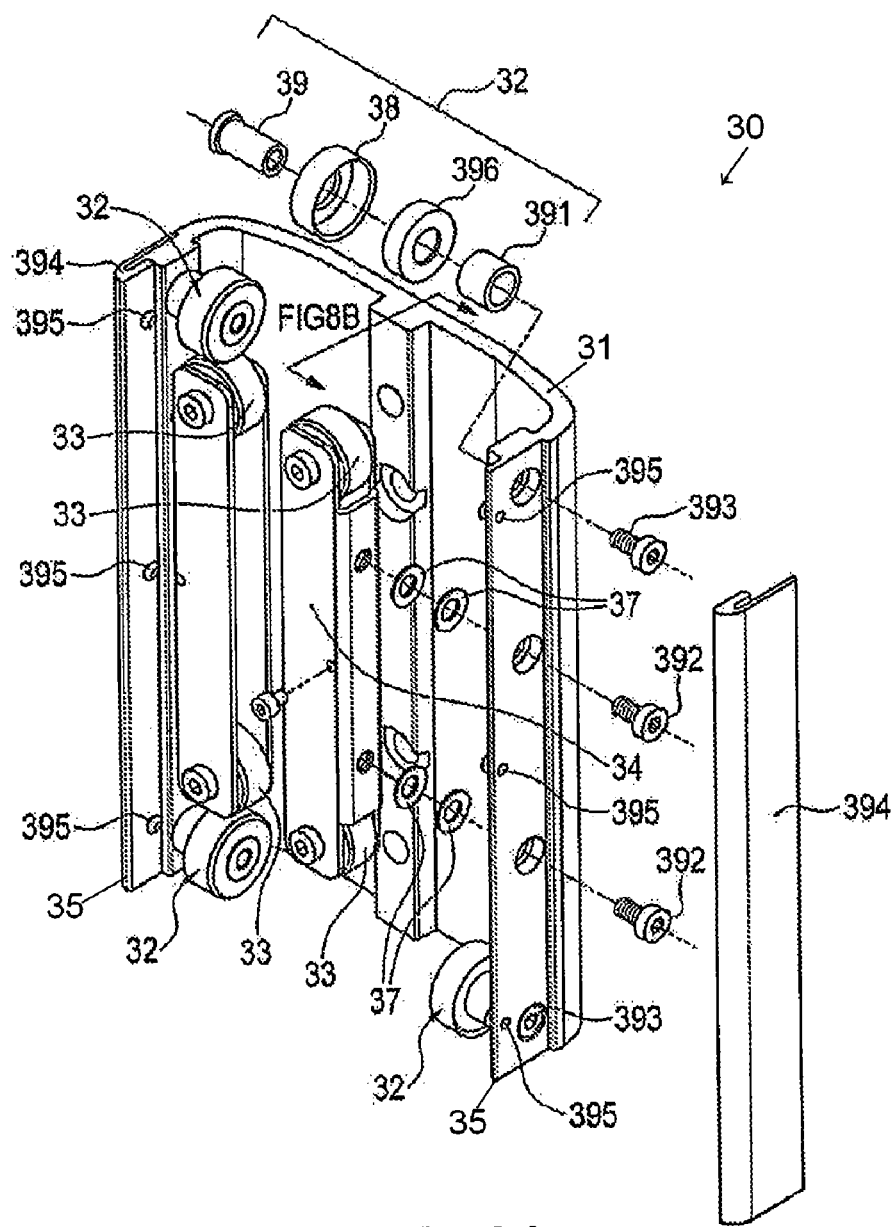
FIGS. 8A and 8B are illustrations of an exploded perspective view and a cross-sectional view of one embodiment of the roller assembly of the present invention.
Figure 8B:
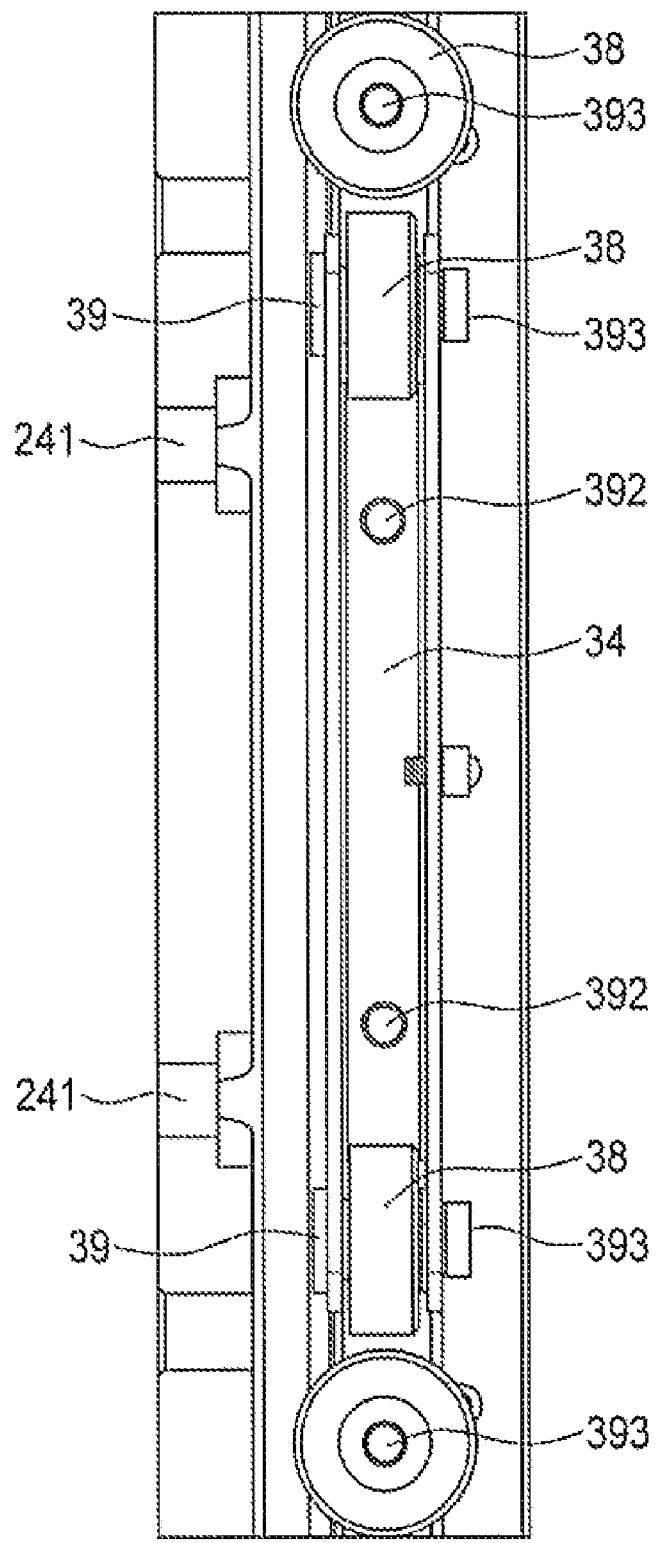

As shown in FIGS. 8A and 8B, the roller assembly 30 may comprise eight bearing assemblies, each bearing assembly 32, 33 comprising a bearing stud 39, a glide bushing 38, a ball bearing 396, and a bearing spacer 391, which are joined in accordance with well known methods of making friction reducing bearing assemblies. Two pairs of bearing assemblies 32 may be mounted to the sides 35 of the carriage 31 by means of mounting screws 393 such that the axes of the bearing assemblies 32 are oriented normally to the sides 35 of the carriage 31 of the roller assembly 30. The roller assembly 30 may further comprise two pairs of spring-loaded bearing assemblies 33, each pair mounted axially to a roller mount piece 34 which facilitates the securing of the spring-loaded bearing assemblies 33 to the sides 35 of the carriage 31 of the roller assembly 30. The roller mount piece 34 may comprise a U-shaped bar, with the pair of spring-loaded bearing assemblies 33 mounted within the U of the U-shaped bar such that the axes of the spring-loaded bearing assemblies 33 are oriented parallel to the sides of the carriage 31 of the roller assembly 30. The roller mount piece 34 may then be spring mounted to the sides 35 of the carriage 31 by means of disc spring washers 37 and mounting screws 392, as seen in FIGS. 8A and 8B. The spring-loaded bearings 33 can assist the counter-balance mechanism 20 with balancing any weight supported by the roller assembly 30. In particular, the spring-loaded bearing assemblies 33 may be helpful to support the roller assembly 30 and any weight supported therein in the event that the weight supported by the roller assembly 30 (i.e., the weight of any accessory secured to the accessory holder) is not matched perfectly to the weight rating of the counter-balance mechanism 20 (as described below). Preferably, as shown in the embodiment shown in FIGS. 6, 8A and 9, a cover 394 has been mounted to the outside of the side 35 of the carriage 31 by internal set screws 395. The cover 394 may be fabricated from any materials known in the art, preferably, the cover 394 comprises plastic or other materials suitable for protecting the roller assembly 30 and for further gripping of the roller assembly 30 by a user. The cover 394 may further be comprised of materials suitable for repeated disinfection such as for a hospital or laboratory setting, as are known in the art, including but not limited to white phenolic resin, plastic, metals, painted surfaces or other easily cleaned or disinfected materials as are known in the art.

Figure 6:
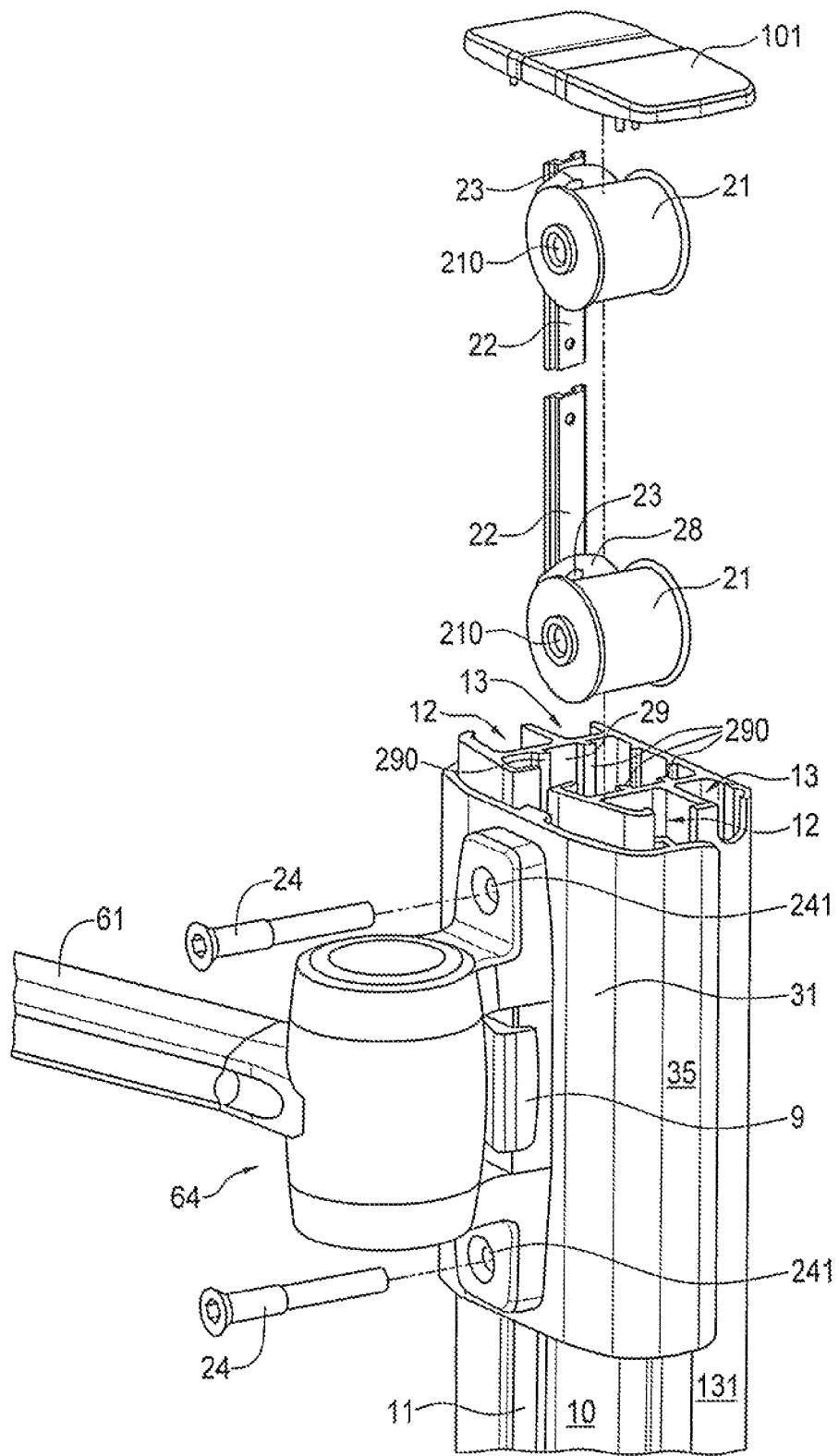
FIG. 6 is an illustration of an exploded perspective view of one embodiment of the counter-balance mechanism of the present invention.
Figure 10:
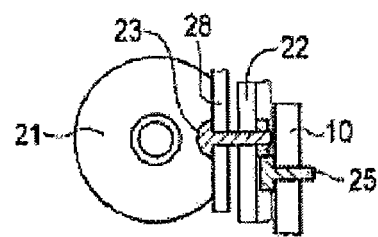
FIG. 10 is an illustration of a cross-sectional view of one portion of an embodiment of the present invention.

Referring to FIGS. 6, 9 and 10, a counter-balance mechanism 20 may be engaged with the roller assembly 30 and the track 10 to balance the weight of an accessory mounted to the roller assembly 30 for effortless positional adjustment of the accessory by a user to any vertical position within the range of the counter-balance mechanism 20. As is known in the art, counter-balance mechanism 20 comprises any one of a constant force spring, a spiral balance, a block and tackle balance, or other low friction devices for balancing the weight of an accessory to be mounted upon the accessory holder 1 by engagement with the roller assembly 30. As shown in FIGS. 6 and 9, the counter-balance mechanism preferably comprises a constant force spring including one or more wound springs 21. Each wound spring 21 (as shown in FIG. 6) comprises a tab 28 for mounting the spring 21 to the spring mount plate 22. As shown in FIGS. 6 and 9, screw 23 secures tab 28 to plate 22. Plate 22 is, in turn, secured to the inner track 11 in any manner known in the art to allow the spring 21 to wind or unwind in order to support the weight of any mounted accessories by virtue of the counter-balance mechanism 20.

In the embodiment shown in FIGS. 1, 6, 9 and 10, the inner channel 11 of track 10 may comprise two opposing grooves 29 formed by flanges 290. The shape of grooves 29 complements the shape of the spring mount plates 22 such that spring mount plates 22 may be inserted into grooves 29 from one edge of the track 10 and slid inward of the grooves 29 until reaching a stop screw 25. Stop screw 25 can be mounted within track channel 10 to prevent spring mount plates 22 from moving downward within track channel 10 (as shown in FIG. 10). The core 210 of wound spring 21 of the counter-balance mechanism 20 may be secured to the roller assembly 30 by bolt 24, which inserts through an aperture 241 and secures to the core 210 of the wound spring 21.

Figure 5A:
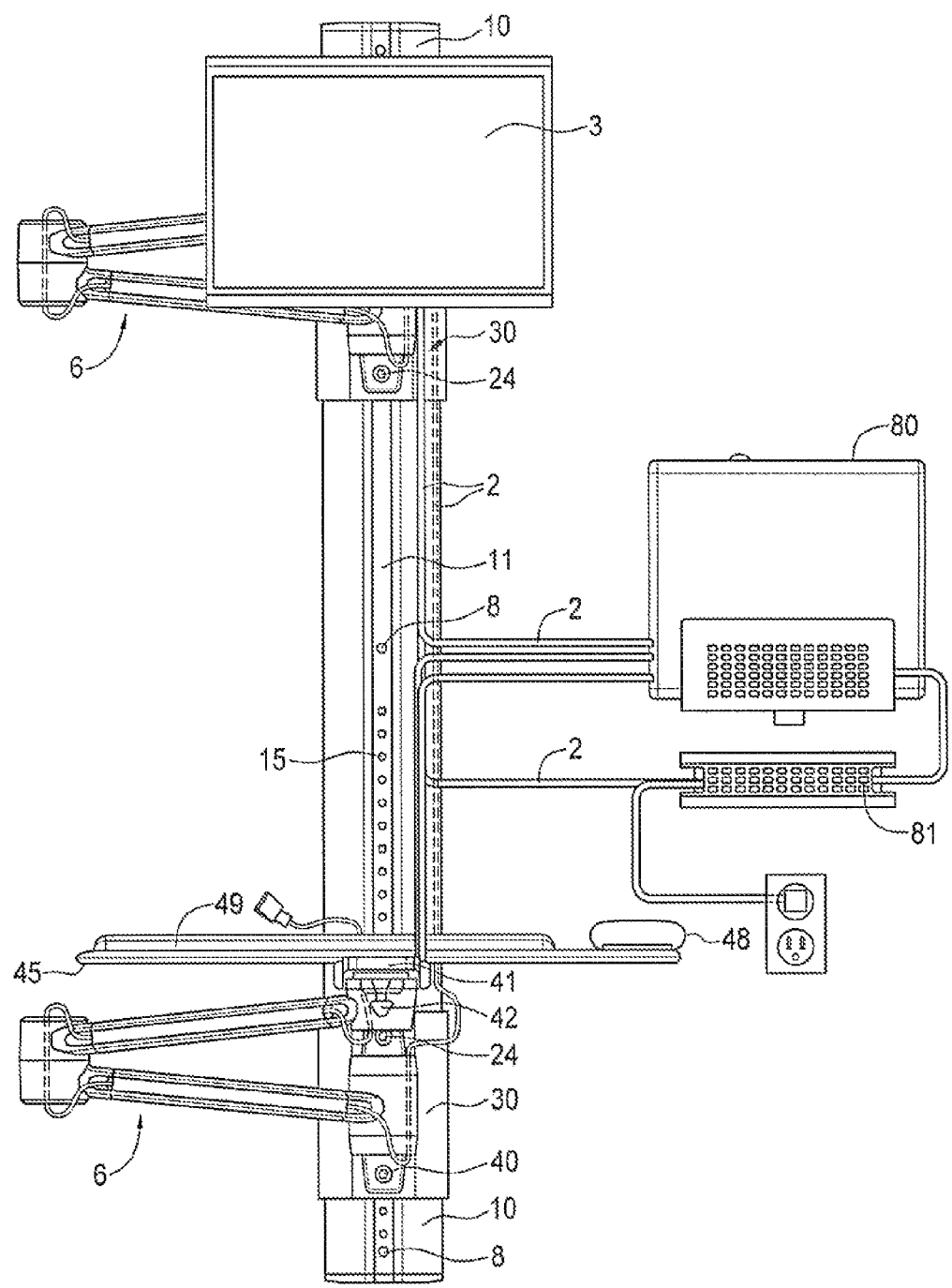
FIG. 5A is an illustration of a front view of the present invention with associated central processing unit and power strip, with cables illustrated; 5B is an illustration of a perspective, close-up view of an embodiment of the articulated arm of the present invention with cables illustrated.

In a preferred embodiment of accessory holder 1, as shown in FIGS. 1, 5A, and 9, a top articulating arm 6 supporting a monitor 3 secured to the accessory mounting bracket 50 attached to the distal end of the articulating arm 6 may be pivotally secured to a first roller assembly 30, which is in turn secured to two wound springs 21, each wound spring 21 secured by screw 23 to a spring mounting plate 22 to support and counter-balance the first roller assembly 30 supporting the monitor 3 by way of bracket 50. In the same embodiment, a bottom articulating arm 6 supporting a keyboard platform 45 secured to an accessory mounting bracket or hinge 41 attached to the distal end of the articulating arm 6 may be pivotally secured to a second roller assembly 30, which is in turn secured to one wound spring 21, which is secured to a spring mounting plate 22 to support and counter-balance the second roller assembly 30 supporting the keyboard.

Referring to FIGS. 1 and 9, the second roller assembly 30 may be secured within the track channel 11 by a socket screw 16, protruding from the lower right of track channel 11 approximately between 1 and 2 inches from the bottom. The first roller assembly 30 may be secured within the top of track channel 11 by socket screw (not shown), protruding in a similar manner from the upper left of track channel 11. To assemble the accessory holder 1, a user would first slide the counter-balance mechanisms 20 into the track channel 11 by sliding the spring mounting plates 22 into grooves 29. Stop screws 25 should be inserted into track channel 11 to prevent the spring mounting plates 22 within grooves 29 from moving downward with gravity. The restraint of the spring mounting plates 22 within track channel 11 by stop screws 25 (as shown in FIG. 10) allows the spring 21 to wind or unwind as the roller assembly 30 secured to the core 210 of the spring 21 moves vertically, which causes the counter-balance mechanism 20 to balance to the weight of the accessories mounted to the attachment means of the present invention, for example, the accessory mounting bracket 50.

It is anticipated that the track 10 will be provided to users with the counter-balance mechanisms 20 already installed within track channel 11. In order to assemble the accessory holder 1, the user then would first remove the socket screw 16, and slide the roller assembly 30 into track channel 11. The user would then insert bolt 24 through the aperture 241 and secure it to the core 210 of a wound spring 21 mounted to the spring mounting plate 22. The user would then replace the socket screw 16 to prevent the roller assembly 30 from exiting the track channel 11. The user likewise would assemble the next roller assembly 30 by removing the socket screw (not shown), and sliding the roller assembly 30 downward into track channel 11. For those roller assemblies requiring two springs 21 to support the weight of an accessory, such as a monitor, the user would then insert two bolts 24 through the two apertures 241 and secure them to the cores 210 of the two wound springs 21. The user should then replace the socket screw to prevent the roller assembly 30 from exiting the track channel 11.

By engaging counter-balance mechanism 20 with the track 10 and with the roller assembly 30, the roller assembly 30 may be raised or lowered along track 10 by a user with exertion of a minimal force; the weight of a mounted accessory supported by the roller assembly 30 is substantially balanced by the counter-balance mechanism 20. As the user moves the roller assembly 30 vertically upward or downward, the springs 21 wind or unwind to provide a constant force to the counter-balance mechanism 20. The roller assembly 30, and an attached keyboard platform 45 or any accessory secured to the roller assembly by an attachment means or the accessory mounting bracket 50, moves effortlessly by a user from any vertical position along the track 10 to another desired vertical position. The constant force provided by the present counter-balance mechanism 20 is preferable to traditional lift systems, e.g., gas, pneumatic or hydraulic springs, because in these traditional systems, movement of the accessories requires an increasing amount of force from the user, as compared to the constant force throughout the entire movement as provided by the present invention.

The counter-balance mechanism 20 provided in the present invention is also preferable to traditional lift systems because the counter-balance mechanism 20 allows for a greater vertical distance for the brackets 30 to travel for vertical positional adjustment. If a system of two accessories were secured to a wall or other structure using a traditional lift system for each accessory, not only would the accessory holder be bulkier and less economical, but the vertical path upon which the first roller assembly 30 travels could not overlap with the vertical path upon which the second roller assembly 30 travels. More specifically, a traditional lift system would prevent the first roller assembly 30 from moving downward into the space the second roller assembly may occupy and vice versa.

Figure 4A:
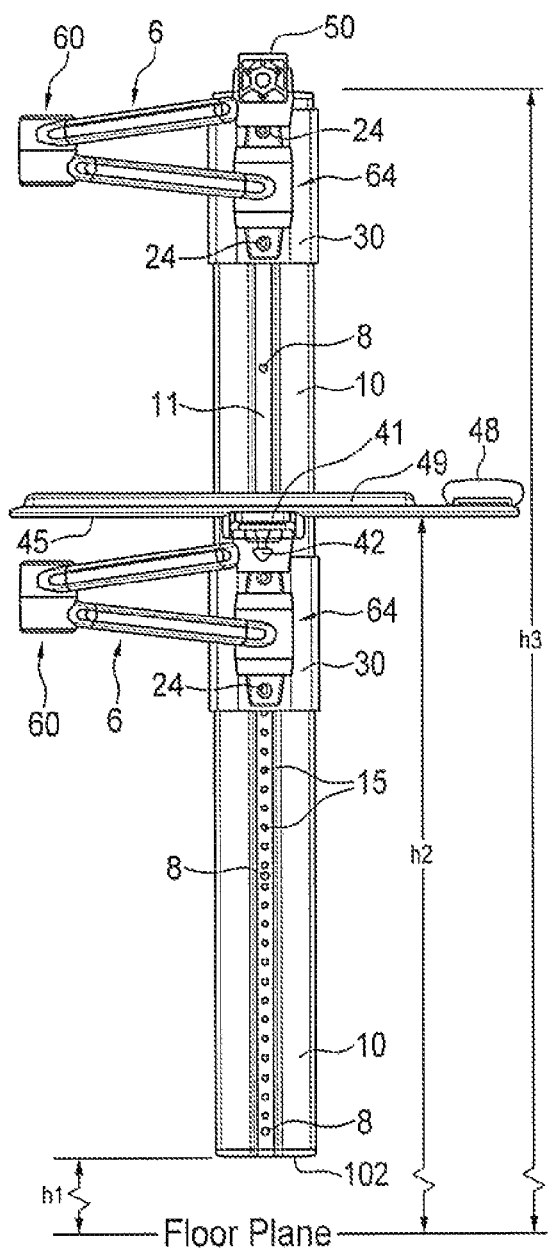
FIGS. 4A and 4B are illustrations of a front view of one embodiment of the present invention in two height positions.
Figure 4B:
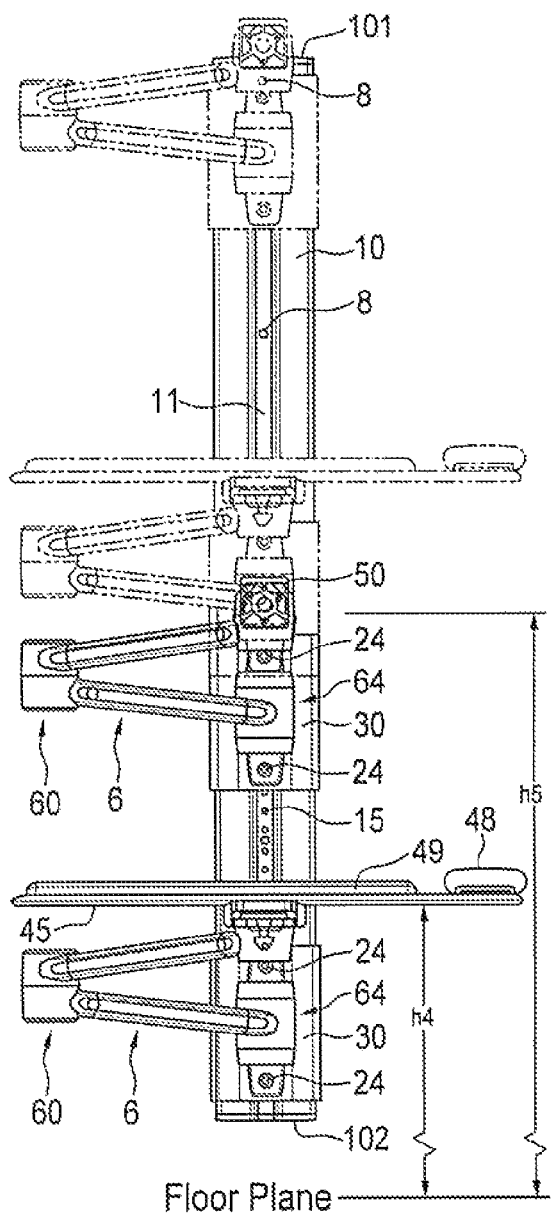

As shown in the embodiments in FIGS. 4A and 4B, two roller assemblies 30, and the accessories secured to them, are able to travel an overlapping distance along track 10, meaning that the upper roller assembly 30 may travel to a vertical position lower than the highest vertical position that the lower roller assembly 30 may achieve. For example, in FIG. 4A, the upper roller assembly 30 is positioned at the top of the track 10 at a distance $h3$ from the floor plane and the lower roller assembly 30 is positioned at a distance of $h2$ from the floor plane. In FIG. 4B, the upper roller assembly 30 has traveled to a distance of $h5$ from the floor plane, while the lower roller assembly 30 has traveled to a distance of $h4$ from the floor plane. The total range of distance traveled by the upper roller assembly 30, or h3 minus h5, and the total range of distance traveled by the lower roller assembly 30, or h2 minus h4, are each greater than the distance that would be allowed with traditional lift systems. The total capable distance equals h3 minus h5 plus h2 minus h4. Given that h3>h2>h5>h4, the total distance traveled is some non-zero amount greater than h3. In a traditional lift system, the total distance traveled by the upper roller assembly 30 and the lower roller assembly 30 would be h3. Therefore, the range of vertical movement of the upper roller assembly 30 and the lower roller assembly 30 is improved by use of the counter-balance mechanisms 20 in the present invention.

The counter-balance mechanism 20 of the present invention, as with all counter-balance devices, is engineered to operate optimally within a particular weight rating. One skilled in the art will recognize that the counter-balance mechanism 20 of the present invention should be selected to be compatible with the particular accessory to be secured to the roller assembly 30 to which the counter-balance mechanism 20 will be removably secured. Moreover, the unique construction of the present invention (i.e., removably securing counter-balance mechanism 20 to track 10 and to roller assembly 30) allows for a user, when needed, to change the counter-balance mechanism 20 to one of a different weight rating, for example, to upgrade a monitor 3 to a different model or type that has a substantially different weight from the original monitor 3. When properly balanced with the accessory 3 supported by the roller assembly 30 to which it is removably secured, the counter-balance mechanism 20 allows the roller assembly 30 to be raised or lowered along track 10 by a user exerting minimal effort upon the accessory mounted to the roller assembly. The user simply moves the accessory upward or downward to start movement of the roller assembly 30 supporting the weight of the accessory and stops movement of the roller assembly 30 at the new desired vertical position of the accessory. Although the counter-balance mechanism 20 shown in FIG. 6 features two constant force spring coils 21, one skilled in the art should appreciate that commercially available counter-balance devices may incorporate one or more coils 21 to provide an appropriate balancing force to the weight of the accessory 3 supported by roller assembly 30.

Unlike an output accessory which may require only passive viewing by a user, e.g., a monitor 3 which may deliver a constant force to the bracket from about 5 to about 30 pounds, an input accessory, e.g. a keyboard or mouse, may deliver a variable force to the roller assembly 30 to which it is attached, for example, because the user rests the weight of his arms or hands onto the accessory or because the user types with fervor into the accessory. For positional adjustment of active accessories, it may not be preferable to employ a counter-balance mechanism 20 featuring two springs 21. Moreover, because a variable force such as typing on a keyboard may cause undesirable movement of the roller assembly 30 to which the accessory is removably mounted while in use, a roller assembly securing such an accessory may benefit from an additional releasable locking mechanism. In one embodiment, the accessory holder 1 of the present invention may utilize a releasable lock pin 40 to engage the roller assembly 30 with one of a plurality of apertures 15 on track 10.

Referring now to the embodiment shown in FIGS. 2, 4A, 4B, and 5A, a releasable lock pin 40 may be utilized to engage the roller assembly 30 supporting the keyboard platform 45. Releasable lock pin 40 may be biased outward with a spring (not shown) to guide the pin 40 into a selected aperture 15 on a rear panel of track 10 such that the second roller assembly 30 is releasably locked into a desired height position by the user. Releasable lock pin 40 may be released by a lever on the roller assembly 30 (not shown). Preferably, a cable guide pull 44 may be attached to the releasable lock pin 40 and threaded from the roller assembly 30 to the keyboard platform 45, in the same manner as accessory cables 2 (see FIG. 2). A release handle 43, 431 may be located on the underside of the keyboard platform 45 at the terminus of the cable guide pull 44, such that when a user pulls the release handle 43 the releasing lock pin 40 is removed from its aperture 15, and the user may move the keyboard platform 45, and thus slide the roller assembly 30 upward or downward to a new vertical position. When the user releases the handle 43, the spring (not shown) forces the releasing lock pin 40 into the closest aperture 15 on the rear panel of the track 10 to the new position.

It should be appreciated by one of skill in the art that many alternative embodiments could be implemented to position the keyboard platform 45. For example, a release handle 43 could be positioned above the keyboard platform 45. Alternatively, a release handle 43 could be positioned on the roller assembly 30 instead of the keyboard platform 45. Moreover, the release handle 43 could be pushed, pulled, slid or otherwise manipulated in any manner to release the lock pin 40. Additionally, other mechanisms for releasably securing the keyboard platform 45 and the roller assembly 30 to which it is mounted should be readily envisioned by those of skill in the art.

One skilled in the art will appreciate that a counter-balance mechanism 20 also could be used alone to positionally adjust the roller assembly 30 supporting the keyboard platform 45. Likewise, instead of a keyboard platform 45, the user may attach an additional passive output device (e.g., monitor 3 or other display device) to the attachment means of the lower roller assembly 30; in such an embodiment, a counter-balance mechanism 20 pivotally secured to the roller assembly 30 and the track 10 would be advised. As will be appreciated by one skilled in the art, the present invention encompasses the use of multiple roller assemblies 30 for supporting a variety of accessories and one or more of the roller assemblies 30 may be operably engaged to counter-balance mechanisms 20 to counter-balance the weight of the accessories supported.

Referring again to the embodiment shown in FIG. 1, instead of mounting directly to the roller assembly 30 via an accessory mounting bracket 50, the accessory may be mounted to an articulating arm 6, which pivotally secures to the roller assembly 30 at a proximal end and to an accessory mounting bracket 50 at a distal end. Preferably, the articulating arm 6 comprises one or more elongated members 61, one or more joints 60 about which the elongated members 61 pivot, and a mounting joint 64 about which the articulating arm 61 pivots but which is also mounted to the roller assembly 30 and the counter-balance mechanism 30, if desired. The distal (relative to the track 10) end of the articulating arm 6 may comprise another joint 60 to which an accessory mounting bracket 50 may be pivotally attached (as shown in the figures), or an accessory mounting bracket 50 may be attached directly to the distal end of the articulating arm 6. The articulating arm 6 provides an increased range of movement for the accessory. Through use of the articulating arm 6, the distal and lateral positions of the accessory (in relation to the track 10) may be adjusted by a user with relative ease. Moreover, by use of an articulating arm 6, an attached accessory may be distally extended forward from the track 10 (and thus the wall to which the track 10 may be mounted) the full length of the articulating arm 6, as shown in FIG. 3A. Alternatively, the attached accessory may be positioned against the track 10 in a stored position, as shown in FIGS. 3B and 3C. The structure of pivot joints 60 and join 64, as more fully described below, enable the large range of motion of a secured accessory when mounted to the accessory holder 1 via an articulating arm 6. In preferred embodiments, the distal end of the articulating arm 6 may extend the accessory to which it is mounted outward up to about five feet from the track 10 and may retract the accessory to rest adjacent to the track 10, as shown in FIGS. 3B and 3C. One of skill in the art should appreciate that the length of the articulating arm 6 is generally preferable for multi-purpose applications of the present invention, but the present invention is not limited to any given length of the articulating arm 6 because specialized applications may require shorter or longer articulating arms 6.

Figure 5B:
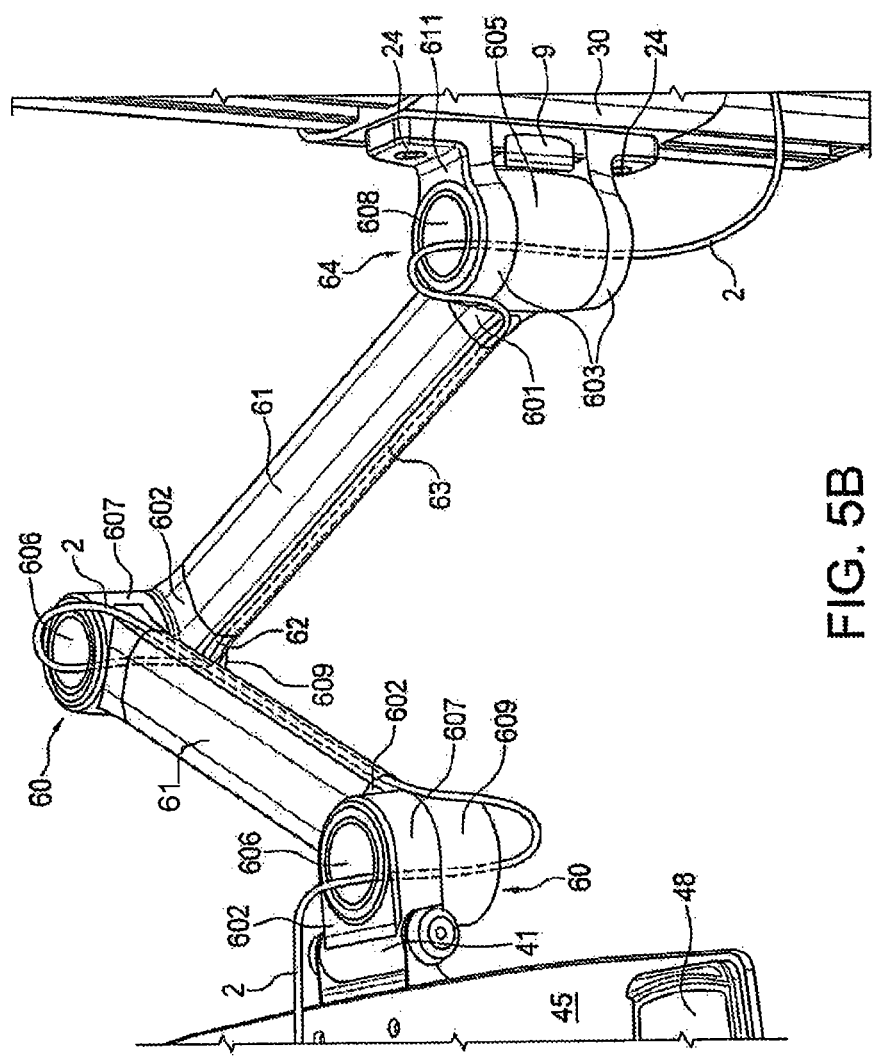

Referring to the embodiment shown in FIG. 5B, general pivot joints 60 connect elongated members 61 of articulating arms 6 (see, e.g., FIG. 1) to each other, to accessory mounting bracket 50 (see, e.g., FIG. 1) or to hinge 41. General pivot joints 60 may comprise two collars 607, 609 operatively engaged to each pivot about an inner hollow cylinder 606. A washer can be situated between the two collars 607, 609 to provide for frictionless pivoting between the collars 607, 609. Collars 607, 609 may comprise extension portions 602 for attachment to elongated members 61 of articulating arm 6 by one or more bolts (not shown) or other comparable conventional securing means, as are known in the art.

Alternatively, as shown in FIG. 1, for general joints 60 connecting a member 61 to accessory mounting bracket 50, accessory mounting bracket 50 may mount directly to collar 609 by one or more bolts other comparable conventional securing means, as are known in the art. As shown in FIG. 5B, for pivot joints 60 connecting a member 61 to hinge 41, which supports keyboard platform 45, extension portion 602 can cooperate with hinge 41 such that keyboard platform 45 can rotate between a horizontal and vertical position about hinge 41. In operation, general pivot joints 60 provide joints to the articulating arm 6 that provide 360 degrees of pivoting between two members 61, between member 61 and an accessory mounting bracket 50, or between member 61 and hinge 41 supporting the keyboard platform 45.

Referring still to the embodiment shown in FIG. 5B, a mounting pivot joint 64, similar in function to the general pivot joint 60, mounts the articulating arm 6 to the roller assembly 30. Joint 64 may comprise a central collar 605, which is pivotally engaged with the proximal (relative to the track 10) end of the articulating arm 6. Central collar 605 may feature an extension 601 for attachment to a member 61 of articulating arm 6 by one or more bolts or other comparable conventional securing means, as are known in the art. Joint 64 further comprises two collars 603, located on the top and bottom of the central collar 605, which each may feature an extension 611 for attachment to the roller assembly 30 by bolts 24. Collars 603 and central collar 605 are operatively engaged to pivot about an inner cylinder 608 such that articulating arm 6, via member 61 attached to extension 601 of central collar 605, pivots freely about joint 64, limited in rotation only by the width of track 10 or an intervening structure to which track 10 is mounted. Washers can be situated between the collars 603, 605 to provide for frictionless pivoting between the collars 603, 605.

In operation, with articulating arms 6 mounted to each roller assembly 30 as shown in FIGS. 1 and 5A, the monitor 3, mounted to a first articulating arm 6, or keyboard platform 45, mounted to a second articulating arm 6, may be positioned outward in any direction from adjacent to the roller assembly 30 to any position within a radial distance approximately equal to the combined lengths of the two members 61 of the articulating arms 6 (see FIG. 3A for extended position), and may further pivot about the general joints 60 at the distal end of the articulating arm 6 to face any direction, limited only by the structure of the attached accessory (for example, the monitor 3 may be prevented from rotating rearward beyond the member 61 attached to the joint 60 to which the accessory mounting bracket 50 is attached). An optional arm stop 9 (as shown best on FIG. 5B) may be mounted on or near the pivot joint 64 in order to limit the degree of pivot allowed to the articulating arm 6 about the pivot joint 64 by providing a cushioning bumper for member 61 of articulating arm 6, as shown in FIGS. 1 and 5B.

Referring to the embodiment shown in FIG. 5B, the present invention allows cables 2 to traverse the articulating arm 6 without obstructing the movement of the articulating arm 6 in any direction. By threading the cables 2 through the hollow centers 606, 608 of the pivot joints 60, 64, and storing the cables 2 in recesses 62 behind covers 63, a user of the present accessory holder 1 can move the articulating arms 6 in any convenient position without kinking or relocating the cables 2 necessary for use of an accessory that may be mounted to the accessory holder 1. The cable management utility of the joint pivots 60, 64 and articulating arms 6 allows use of accessories with cables 2 such that cables 2 are not stretched or bound when the articulating arm 2 is fully extended and such that cables 2 are not loosely hanging when the articulating arm 2 is folded inward to a stored position.

Figure 2:
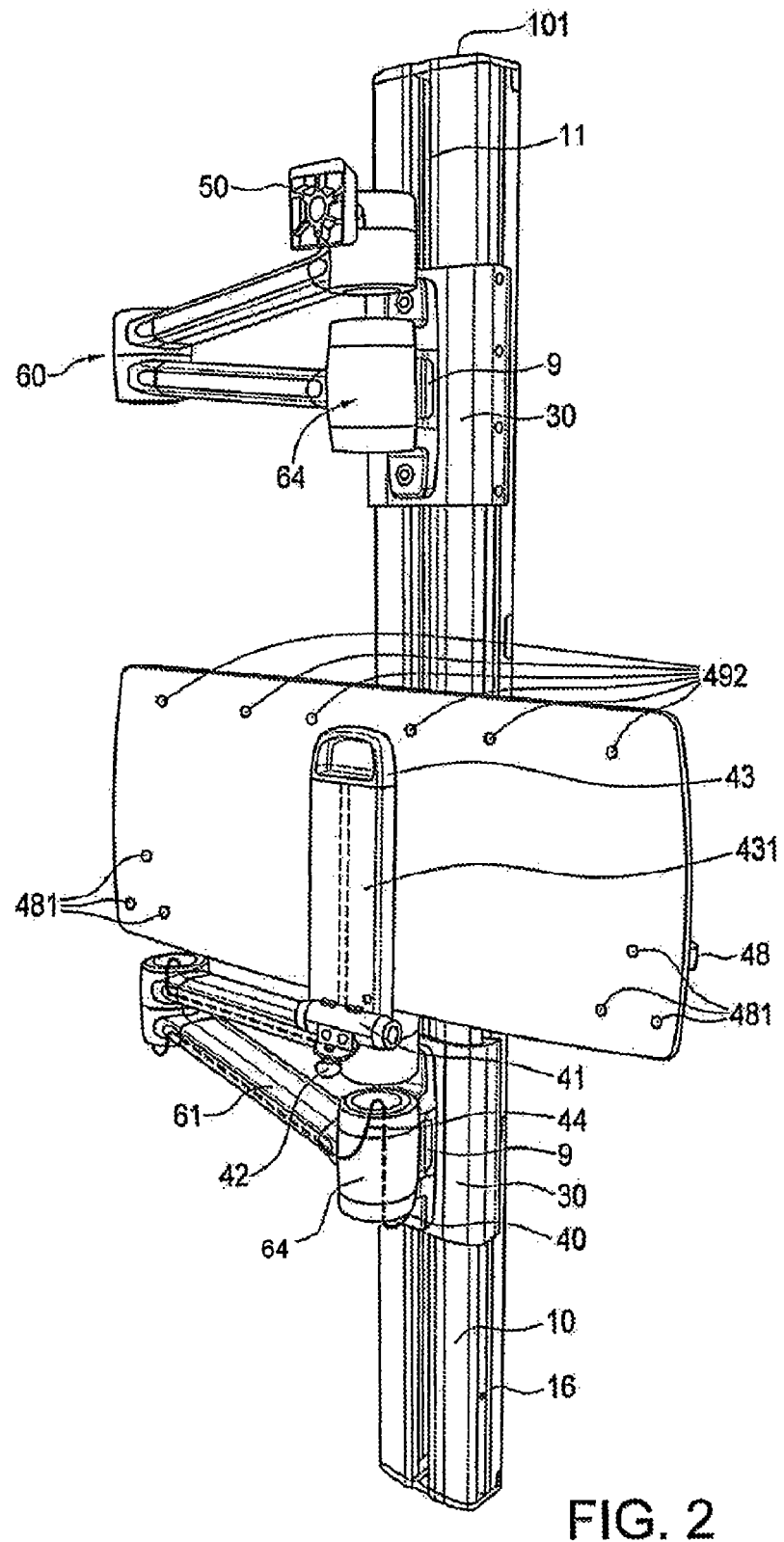
FIG. 2 is an illustration of a perspective view of the embodiment shown in FIG. 1 in a different configuration.

Referring now to the embodiment shown in FIG. 2, the articulating arms 6 are illustrated in the storage position. In this embodiment, the keyboard platform 45 may optionally rotate about hinge 41 upward about ninety degrees from horizontal to store substantially vertically against the track 10. The hinge 41 may include a torsion spring (not shown but known in the art) with a locking mechanism (not shown but known in the art) to keep the keyboard platform 45 locked into a horizontal position when in use. When the locking mechanism is released, the keyboard platform 45 may spring upward to its stored vertical position. In an alternative embodiment, the hinge 41 may fold downward and remain in place under the weight of an accessory or other item placed upon the platform 45.

As shown in FIGS. 2 and 3C, the hinge 41 may comprise a frictional hinge adapted to control the tilt adjustment of the keyboard platform 45 from its horizontal position to an angled position from about zero degrees to about fifteen degrees of tilt above horizontal. The frictional hinge 41 may include a thumbscrew 42 for locking and releasing the hinge 41. In operation, the user may adjust the angle of the keyboard platform 45 by turning the thumbscrew 41 counter-clockwise to loosen the engagement, adjusting the tilt angle of the keyboard platform 45, then turning the thumbscrew 42 clockwise to lock the hinge 41 again. Typically, a user negatively tilts the keyboard platform 45 from zero to about fifteen degrees to better support typing at a keyboard 4 placed upon the platform 45. In other embodiments, the hinge 41 may comprise other means known in the art for a user to adjust the tilt of the keyboard platform 45.

As may be understood by one skilled in the art, the embodiments shown in the figures is exemplary of one arrangement of the articulating arms 6 of the present invention. However, the present invention is not limited to this arrangement, but, rather, encompasses other articulating systems as are known in the art. For example, the articulating arms 6 of the present invention could encompass different pivot joints, or more than two elongated members 61 to create articulating arms 6 of varying lengths and articulation capability.

Figure 7A:
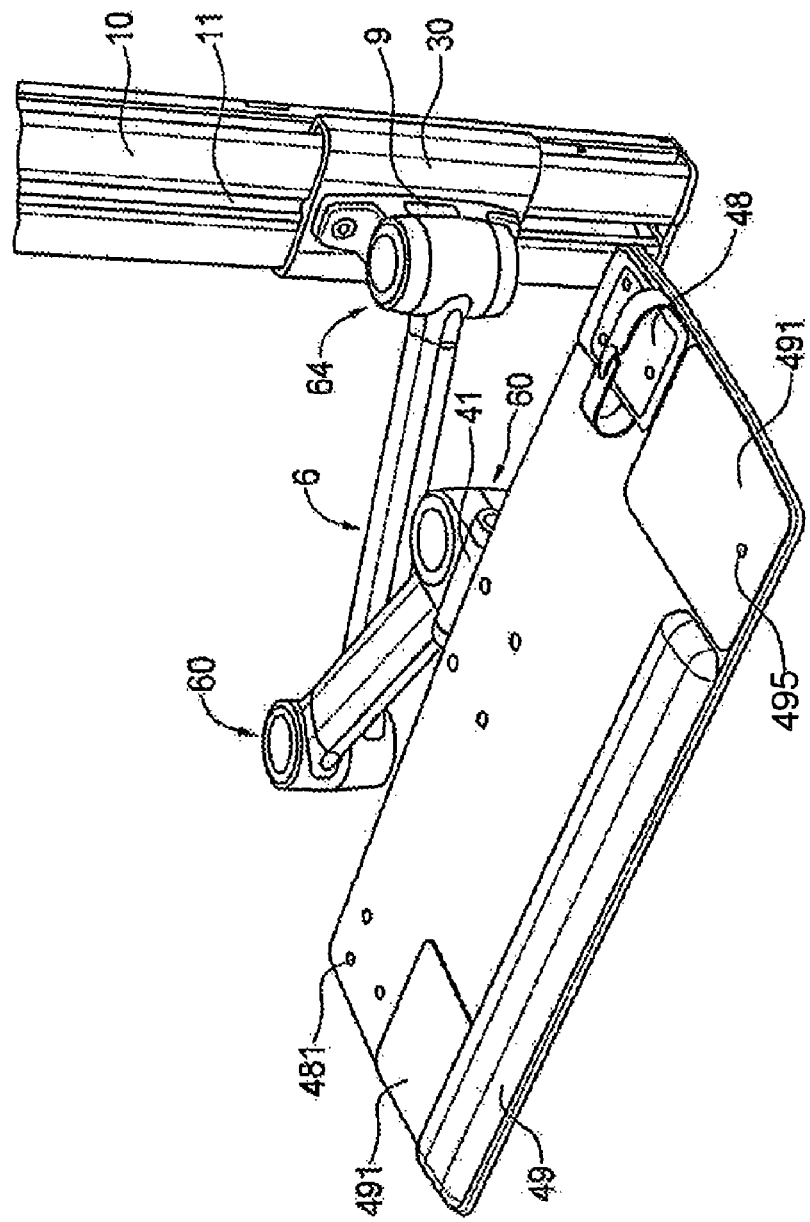
FIGS. 7A and 7B are illustrations of two perspective views of the keyboard platform of one embodiment of the invention.
Figure 7B:
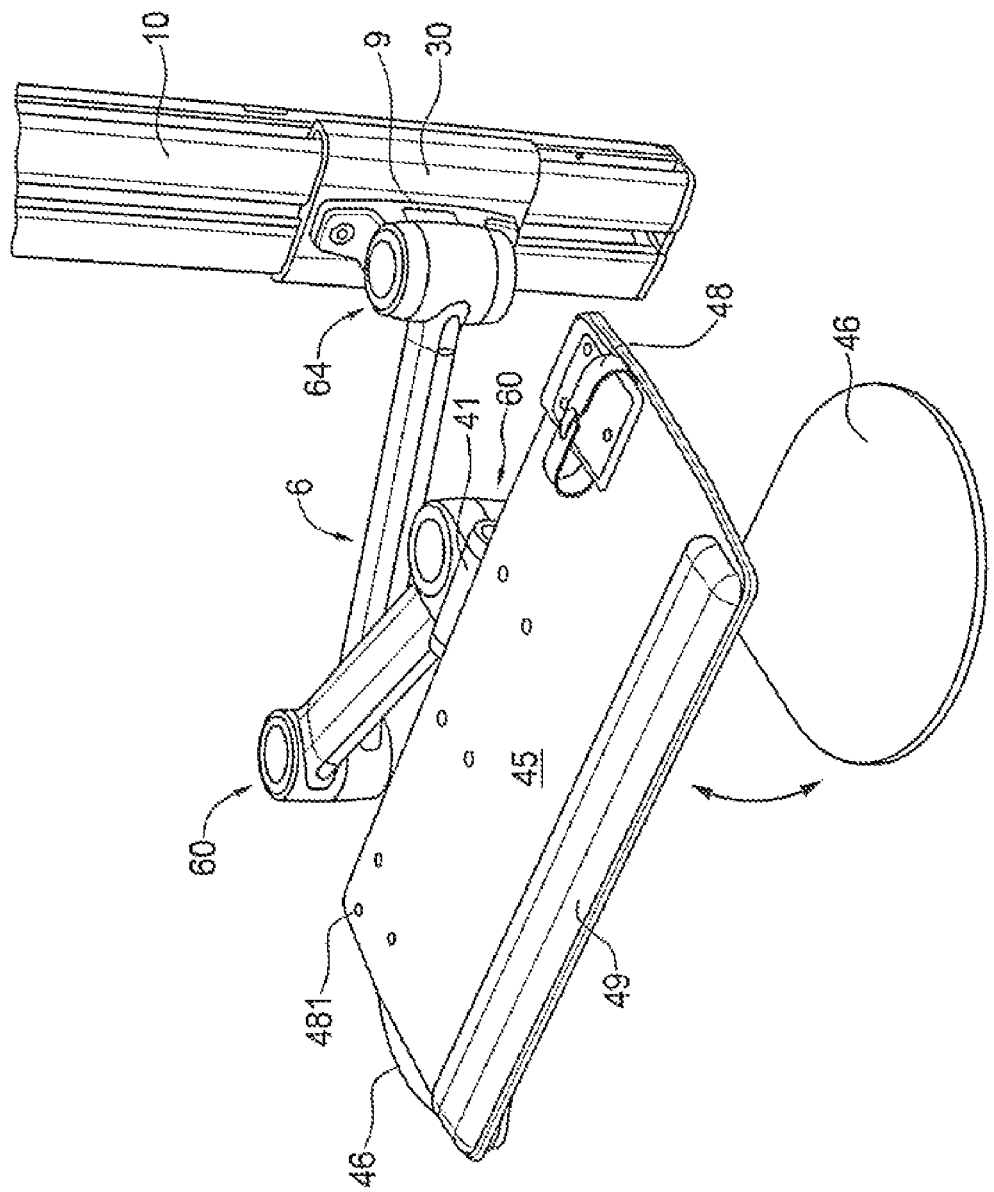

Referring now to the embodiment shown in FIGS. 1, 7A and 7B, the keyboard platform 45 may be constructed of any materials suitable for supporting an accessory like a keyboard and/or a mouse. Preferably, particularly in sterile hospital or laboratory applications, the keyboard platform 45 may be constructed of white phenolic resin. For convenience to a user of the platform 45, the keyboard platform 45 may comprise a wrist support 49, mouse pad 491 and/or mouse retainer 48 or any combination therein. The wrist support 49, which are known in the art and which may be comprised of a length of any cushioning or supportive material, including without limitation silicone gel, beads or foam encased in fabric or other materials suitable for human skin movement, in order to support the wrists of a user in an ergonomically beneficial position when utilizing a keyboard, may be secured to the surface of the platform 45 by any means known in the art (including but not limited to hook-and-loop fabric tape, adhesive, guide pins and the like). The mouse pad 491, which may be comprised of a small section of any flat substrate suitable to enhance the operation of a computer mouse, may also be secured to the surface of the platform 45 by any means known in the art. In order to secure the wrist support 49, the mouse pad 491 in a removable manner, the wrist support 49 and the mouse pad 491 may comprise pins protruding from their under-surfaces for receiving engagement with holes 492 on the top surface of the platform 45. The holes 492 on the top surface of the platform 45 may be spaced along the distal edge of the surface such that the wrist support 49 may be placed in a left or right position, as directed by the handedness of the user. In one embodiment, as seen in FIG. 7A, the platform 45 may comprise two mouse pads 491 secured to the keyboard platform 45, one in a left position and one in a right position. When configured in this manner, the mouse pads 491 may also comprise a small hole 495 for engagement with the wrist support 49. In operation, a user may detach the wrist support 54 from a left position with the right mouse pad 491 exposed, and reattach the wrist support 49 by securing pins to hole 495 on the right mouse pad 491 such that wrist support 49 is in a right position with the left mouse pad 491 exposed.

It should be understood by one skilled in the art that an accessory holder 1 adaptable for use by a variety of users, particularly in high traffic areas such as hospital rooms or laboratories, should preferably accommodate both right- and left-handed users. Moreover, alternatively, the mouse pad 491 and the wrist support 49 may be releasably or fixedly secured to the keyboard platform by any conventional means known in the art (including but not limited to hook-and-loop fabric tape, adhesive, guide pins, bolts, screws, rivets or other means).

An optional mouse retainer 48 may comprise one or more straps that are capable of stretching in all directions to restrain a computer accessory, e.g. a mouse, pointer, stylus or other peripheral device. The mouse retainer 48 retains the peripheral device when the keyboard platform 45 is not in use, or when the keyboard platform 45 is stored in an upward position. Without mouse retainer 48, the peripheral device may be lost or fall to the floor while storing or moving the keyboard platform 45. In some embodiments, the mouse retainer 48 may comprise a frame and one or more straps that are adjustable within or below the frame such that the straps can accommodate any size or type of peripheral device and can be releasably secured to the frame easily by a user.

Referring still to FIGS. 1, 7A and 7B, the mouse retainer 48 may be secured to the platform 45 in a right or left position by any means known in the art. Alternatively, the mouse retainer 48 also may be removably secured to the platform 45 by means of pin 481 using a similar pin and hole arrangement as used with the wrist support 49 or mouse pad 491 such that the mouse retainer 48 may be positioned either in a left or right position. Moreover, alternatively, the mouse retainer may be releasably or fixedly secured to the keyboard platform by any conventional means known in the art (including but not limited to hook-and-loop fabric tape, adhesive, guide pins, bolts, screws, rivets or other means). A suitable mouse retainer for use in the present invention is described in an application entitled "Apparatus And Method For Retaining A Computer Input Device," filed contemporaneously herewith by inventors Jeffery Theesfeld, Shaun Smith, Cory Brechbill and Jarrett Seng and assigned to Humanscale Corporation, which is hereby incorporated by reference. Other mouse retainers, as are known in the art, may be used.

Referring to FIGS. 7A and 7B, the keyboard platform 45 may further comprise a separate swivel platform 46, which pivotally attaches to the under-surface of the platform 45 such that a user swivels the mouse platform 46 out from under the keyboard platform 45 for use, or swivels the mouse platform 46 out of the way underneath the keyboard platform 45 when not in use. A second mouse platform 46 may be attached on the opposite side, or the mouse platform 46 may be removably secured by any means known in the art to either side such that a user can secure the mouse platform 46 to either side to the other to accommodate the user's handedness. As described above, the keyboard platform 45 features ambidextrous components for the convenience of its users.

Referring to the embodiment shown in FIGS. 2 and 5B, the distal end of the articulating arm 6 may comprise a joint 60 featuring extension 602 from collar 607 pivotally engaged with an accessory mounting bracket 50. Preferably, when securing a monitor, the accessory mounting bracket 50 comprises a ball joint, and more preferably, a VESA® compliant ball joint. The Video Electronics Standards Association (VESA®) is an organization of technology based companies proposing standards for the video electronics market. One standard for mounting attachment of video displays is the VESA® Flat Display Monitor Interface standard or VESA®FDMI™. The VESA® FDMI™ Standard defines mounting interfaces, hole patterns, and associated cable/power supply locations for LCD monitors, plasma displays and other flat panel devices. Under this standard, VESA® compliant video displays are equipped with either a 75×75 mm mounting hole pattern or a 100×100 mm mounting hole pattern. Further, VESA® compliant mounting patterns may be found on other types of devices that could also be beneficially attached to the accessory mounting bracket 50 of the invention for improving ergonomy related to adjustable positioning of the attached monitor 3. Alternatively, other bracket types could be used to allow for attachment of other accessories. The accessory mounting bracket 50 is further adapted, by use of a ball joint, to provide for up to sixty degrees of tilt by the attached monitor 3 in a horizontal or vertical direction for additional adjustment. The ball joint of the bracket 50 also allows the monitor 3 to rotate 360 degrees such that it may be viewed in a portrait or landscape position.

Referring now to the figures, and in particular FIGS. 5A and 5B, members 61 of articulating arms 6 may comprise recesses 62 along their length to restrain the power, data, and other cables 2 associated with computer accessories mounted to the accessory holder 1. Preferably, members 61 further comprise covers 63 to retain cables 2 within recesses 62. Covers 63 may snap into place over the recesses 62 to conceal cables 2 from observers. When an accessory, such as a keyboard or monitor 3, is placed on the platform 45 or attached to the bracket 50, the associated cables 2 may be run (from the monitor 3 or other accessory, for example) through the center of inner cylinders 608, 606 of pivot joints 64, 60 (respectively) within recesses 62 under covers 63 of members 61. Depending on the location of the central processing unit 80 and the power supply 81, the cables 2 may exit the accessory holder 1 as shown in FIG. 5A and connect directly to the central processing unit 80 and the power supply 81, the cables 2 may run within the cable channels 13 of track 10 under covers 15, as should be appreciated by skilled artisans.

The accessory holder 1 of the present invention is further adaptable to use in different settings, and with a variety of devices, in that the members 61 of the articulating arms 6 of the accessory holder 1 can comprise a variety of lengths to provide various ranges of adjustment of mounted accessories. Moreover, as previously discussed, the articulating arms 6 may be removed from the holder 1, and the accessories mounted directly to the roller assembly 30 by an accessory mounting bracket 50 pivotally secured to the roller assembly 30. As would be readily envisioned by one of skill in the art, the various mechanisms described herein are particularly useful in combination for providing functional, attractive accessory holders 1 that allow for easy positional adjustment of attached accessories. All combinations of the multiple mechanisms described herein are therefore encompassed by the present invention.

The parts of the present invention may be fabricated from suitable materials as are known in the art. In particular, because the present invention may be used in hospital or clinic applications, in such applications, it is preferable that the parts of the present invention are fabricated from materials that can be easily disinfected. For example, the parts of the present invention may be fabricated from white phenolic resin, plastics, metals and painted surfaces which can be easily cleaned or disinfected.

Many modifications and other embodiments of the inventions set forth herein will come to mind to one skilled in the art to which these inventions pertain having the benefit of the teaching presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An accessory holder comprising:
   a) a vertical track having a plurality of apertures;
   b) a roller assembly slidably engaged with the track;
   c) an attachment assembly adapted to mount an accessory to the roller assembly, the attachment assembly comprising: i) a releasable lock pin engagable with one of the plurality of apertures to lock the roller assembly along the track; ii) an articulating arm having a proximal end and a distal end, the proximal end pivotally attached to the roller assembly; iii) an accessory mounting device attached to the distal end of the articulating arm; and iv) a release handle in operative engagement with the releasable lock pin by way of a cable guide pull; and
   d) a counter-balance device for balancing the weight of the accessory, the counter-balance device operably engaged to the track and to the roller assembly.

2. The accessory holder of claim 1, wherein: the vertical track comprises an exposed inner channel; and the roller assembly is slidably engaged within the inner channel of the track.

3. The accessory older of claim 1, wherein: the vertical track comprises at least one exposed side channel; and the roller assembly is slidably engaged within the at least one side channel of the track.

4. The accessory holder of claim 1, wherein the vertical track comprises a rear panel including the plurality of apertures, the apertures being spaced apart and operable to receive screws therethrough to mount the vertical track to a substantially flat surface.

5. The accessory holder of claim 1, wherein the plurality of apertures, the releasable lock pin, and the release handle cooperate to releasably engage the roller assembly at a plurality of vertical positions along the track.

6. The accessory holder of claim 1, wherein the roller assembly comprises a carriage and at least one friction reducer engaging the carriage and the vertical track to facilitate sliding movement of the roller assembly within the vertical track.

7. The accessory holder of claim 6, wherein the carriage is U-shaped.

8. The accessory holder of claim 6, wherein:
   the vertical track includes at least one side channel;
   the carriage includes opposing sides;
   the at least one friction reducer comprises at least one pair of bearing assemblies secured to the sides of the carriage; and
   the bearing assemblies slide within the at least one side channel of the vertical track.

9. The accessory holder of claim 6, wherein the roller assembly further comprises: a roller mount secured to a side of the carriage; and at least one pair of spring-loaded bearing assemblies is mounted to the roller mount and operable to provide support to the weight of the accessory.

10. The accessory holder of claim 1, wherein the counter-balance device comprises a constant force spring device.

11. The accessory holder of claim 10, wherein the constant spring force device comprises at least one wound spring, each having a first end secured to the track and a second end secured to the roller assembly such that the constant spring force device is operable to balance the weight of the accessory mounted to the attachment assembly as the roller assembly moves along the vertical track.

12. The accessory holder of claim 1, wherein the accessory mounting device comprises one of: a ball joint; a bracket; and a hinge.

13. The accessory holder of claim 1, wherein the accessory mounting device is operable to mount to a flat-screen display.

14. The accessory holder of claim 1, wherein the accessory mounting device comprises a hinge mount to a keyboard platform.

15. The accessory holder of claim 14, wherein the keyboard platform is operable to rotate between a horizontal position and a vertical position.

16. The accessory holder of claim 1, wherein the articulating arm further comprises: at least two elongated members; and at least one pivot joint connecting the elongated members together such that the elongated members pivot with respect to each other.

17. The accessory holder of claim 16, wherein at least one of the elongated members comprises a recess adapted to retain at least one cable associated with the accessory.

18. The accessory holder of claim 17, wherein the at least one elongated member comprising a recess further comprises a cover which retains the at least one cable associated with the accessory within the recess.

19. An accessory holder comprising:
   a) a vertical track having a plurality of apertures;
   b) first and second roller assemblies each slidably engaged with the track;
   c) a first attachment assembly adapted to mount a first accessory to the first roller assembly, the first attachment assembly comprising: i) a first releasable lock pin engagable with one of the plurality of apertures to lock the first roller assembly along the track; ii) a first articulating arm having a proximal end and a distal end, the proximal end pivotally attached to the first roller assembly; iii) a first accessory mounting device attached to the distal end of the first articulating arm; and iv) a first release handle in operative engagement with the first releasable lock pin by way of a first cable guide pull;

d) a second attachment assembly adapted to mount a second accessory to the second roller assembly, the second attachment assembly comprising: i) a second releasable lock pin engagable with one of the plurality of apertures to lock the second roller assembly along the track; ii) a second articulating arm having a proximal end and a distal end, the proximal end pivotally attached to the second roller assembly; iii) a second accessory mounting device attached to the distal end of the second articulating arm; and iv) a second release handle in operative engagement with the second releasable lock pin by way of a second cable guide pull;

e) a first counter-balance device for balancing the weight of the first accessory, the first counter-balance device operably engaged to the track and to the first roller assembly; and f) a second counter-balance device for balancing the weight of the second accessory, the second counter-balance device operably engaged to the track and to the second roller assembly.

20. The accessory holder of claim 19, wherein the first accessory mounting device comprises one of: a ball joint; a bracket; and a hinge.

21. The accessory holder of claim 20, wherein the first accessory mounting device includes a hinge attached to a keyboard platform such that the keyboard platform is operable to rotate between a horizontal and a vertical position.

22. The accessory holder of claim 21, further comprising an actuator engaged with the hinge, wherein manipulation of the actuator is operable to tilt the keyboard platform at an angle between horizontal and vertical positions.

23. The accessory holder of claim 21, wherein the keyboard platform comprises a wrist support removably secured to the keyboard platform.

24. The accessory holder of claim 21, wherein the keyboard platform further comprises a mouse retainer removably secured to the keyboard platform, the mouse retainer adapted to restrain a computer mouse from movement during horizontal or vertical movement of the keyboard platform.

25. The accessory holder of claim 21, wherein the keyboard platform further comprises at least one swivel platform pivotally engaged with a bottom surface of the keyboard platform such that the swivel platform is operable to be extended out from and retracted underneath the keyboard platform.

26. The accessory holder of claim 21, wherein the keyboard platform comprises phenolic resin.

27. An accessory holder comprising:
a vertical track;
at least one roller assembly slidably engaged with the track; each roller assembly comprising an attachment means adapted to pivotally engage an accessory to the roller assembly; and
at least one counter-balance means, each counter-balance means operably engaged to the track and to the roller assembly such that the vertical position of the accessory may be slidably adjusted along the track by a user exerting force upon the attachment means, and wherein the counter-balance means balances the weight of the accessory;
wherein the attachment means comprises a releasable lock pin operatively engaging the roller assembly to the track at one of a plurality of apertures; and
wherein the attachment means further comprises an articulating arm pivotally engaged to the roller assembly at its proximal end and pivotally engaged to an accessory mounting bracket at its distal end, wherein the accessory mounting bracket comprises a release handle in operative engagement with the releasable lock pin by way of a cable guide pull, such that pulling the release handle removes the lock pin from the aperture on the track to release the roller assembly from the track, and releasing the release handle allows the lock pin to return into an adjacent aperture on the track to secure the roller assembly to the track.

28. The accessory holder of claim 19, wherein the second accessory mounting device comprises one of: a ball joint; a bracket; and a hinge.

* * * * *